US011783496B2

(12) United States Patent
Bazarevsky et al.

(10) Patent No.: US 11,783,496 B2
(45) Date of Patent: Oct. 10, 2023

(54) SCALABLE REAL-TIME HAND TRACKING

(71) Applicant: Google LLC, Mountain View, CA (US)

(72) Inventors: Valentin Bazarevsky, San Jose, CA (US); Fan Zhang, Sunnyvale, CA (US); Andrei Vakunov, Mountain View, CA (US); Andrei Tkachenka, Mountain View, CA (US); Matthias Grundmann, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 32 days.

(21) Appl. No.: 17/527,463

(22) Filed: Nov. 16, 2021

(65) Prior Publication Data

US 2022/0076433 A1 Mar. 10, 2022

Related U.S. Application Data

(63) Continuation of application No. 16/709,128, filed on Dec. 10, 2019, now Pat. No. 11,182,909.

(51) Int. Cl.
G06T 7/246 (2017.01)
G06T 7/73 (2017.01)
G06V 40/20 (2022.01)

(52) U.S. Cl.
CPC ............... G06T 7/251 (2017.01); G06T 7/75 (2017.01); G06V 40/28 (2022.01); *G06T 2207/20081* (2013.01); *G06T 2207/30196* (2013.01)

(58) Field of Classification Search
CPC ............ G06K 9/00355; G06K 9/00375; G06T 2207/20081; G06T 2207/30196; G06T 7/251; G06T 7/75; G06N 20/00
See application file for complete search history.

(56) References Cited

U.S. PATENT DOCUMENTS 10,013,070 B2  7/2018 Ahn et al.
10,579,869 B1 * 3/2020 Xiong .................... G06N 20/10
(Continued)

FOREIGN PATENT DOCUMENTS

CN  106469268       3/2017
CN  109086725 B  * 1/2021  ......... G06K 9/00355
(Continued)

OTHER PUBLICATIONS

Ziaolong Zhu A Two-stage Detector for Hand Detection in Egocentric Videos Published on 2016 (Year: 2016).*
(Continued)

*Primary Examiner* — Nizar N Sivji
(74) *Attorney, Agent, or Firm* — Dority & Manning, P.A.

(57) ABSTRACT

Example aspects of the present disclosure are directed to computing systems and methods for hand tracking using a machine-learned system for palm detection and key-point localization of hand landmarks. In particular, example aspects of the present disclosure are directed to a multi-model hand tracking system that performs both palm detection and hand landmark detection. Given a sequence of image frames, for example, the hand tracking system can detect one or more palms depicted in each image frame. For each palm detected within an image frame, the machine-learned system can determine a plurality of hand landmark positions of a hand associated with the palm. The system can perform key-point localization to determine precise three-dimensional coordinates for the hand landmark positions. In this manner, the machine-learned system can accurately track a hand depicted in the sequence of images using the precise three-dimensional coordinates for the hand landmark positions.

19 Claims, 23 Drawing Sheets

(56) References Cited

U.S. PATENT DOCUMENTS

| | | | | |
|---|---|---|---|---|
| 2015/0071487 | A1* | 3/2015 | Sheng | G06T 7/246 |
| | | | | 382/103 |
| 2015/0177846 | A1* | 6/2015 | Yin | G06F 3/0304 |
| | | | | 382/103 |
| 2017/0038846 | A1* | 2/2017 | Minnen | G06V 40/28 |
| 2018/0024641 | A1* | 1/2018 | Mao | A63F 13/428 |
| | | | | 382/103 |
| 2018/0088671 | A1* | 3/2018 | Wang | G06F 3/017 |
| 2019/0034714 | A1* | 1/2019 | Barth | G06V 40/28 |
| 2019/0278983 | A1* | 9/2019 | Iqbal | G06N 5/046 |
| 2020/0193638 | A1* | 6/2020 | Taylor | G06T 7/75 |
| 2020/0301513 | A1* | 9/2020 | Mejia Cobo | G06F 3/011 |
| 2021/0052249 | A1* | 2/2021 | Gafner | G16H 50/30 |
| 2021/0081055 | A1* | 3/2021 | Sinha | G06V 30/194 |
| 2021/0183097 | A1* | 6/2021 | Georgakis | G06V 20/653 |

FOREIGN PATENT DOCUMENTS

| | | | |
|---|---|---|---|
| CN | 112183424 A | * | 1/2021 |
| EP | 3686772 A1 | | 7/2020 |

OTHER PUBLICATIONS

Learning to Estimate 3D Hand Pose from Single RGB Images—2017 (Year: 2017).*

Visual Recognition of Continuous Hand Postures—2002 (Year: 2002).*

FPGA Implementation of a Neural Network for a Real-Time Hand Tracking System—2002 (Year: 2002).*

Bazarevsky et al., "BlazeFace: Sub-Millisecond Neural Face Detection on Mobile GPUs", arXiv:1907.05047v2, Jul. 14, 2019, retrieved Dec. 10, 2019, 4 pages.

Bazarevsky et al., "On-Device, Real-Time Hand Tracking with MediaPipe", Aug. 19, 2019, https://ai.googleblog.com/2019/08/on-device-real-time-hand-tracking-with.html, retrieved on Dec. 10, 2019, 7 pages.

Common Objects in Context, http://cocodataset.org/#detection-eval, retrieved Dec. 10, 2019, 3 gages.

GitHub, "Hand Tracking (GPU)", Aug. 16, 2019, https://github.com/google/mediapipe/blob/master/mediapipe/docs/hand_tracking_mobile_gpu.mdm retrieved on Dec. 10, 2019, 21 pages.

GitHub, "mediapipe", Jun. 16, 2019, https://github.com/google/mediapipe/blob/master/mediapipe/docs/examples.md, retrieved Dec. 10, 2019, 5 pages.

GitHub, "mediapipe", Jun. 29, 2019, https://github.com/google/mediapipe/, retrieved Dec. 10, 2019, 3 pages.

Gomez-Donoso et al., "Robust Hand Pose Regression Using Convolutional Neural Networks", Robot 2017: Third Iberian Robotics Conference, vol. 693, 2018, pp. 591-602.

Kartynnik et al., "Real-Time Facial Surface Geometry from Monocular Video on Mobile GPU's", https://drive.google.com/file/d/1mWpYDANuvP7hcgbqjkjbDKxuYFO7QoKB/view, Conference on Computer Vision and Pattern Recognition, Long Beach, California, Jun. 17, 2019, 4 pages.

Lin et al., "Feature Pyramid Networks for Object Detection", arXiv:1612.03144v2, Apr. 19, 2017, retrieved Dec. 10, 2019, 10 pages.

Lin et al., "Focal Loss for Dense Object Detection", arXiv:1708.02002v2, Feb. 7, 2018, retrieved Dec. 10, 2019, 10 pages.

Liu et al., "SSD: Single Shot MultiBox Detector", arXiv:1512:02325v5, Dec. 29, 2016, retrieved Dec. 10, 2019, 17 pages.

Papandreou et al., "Towards Accurate Multi-Person Pose Estimation in the Wild", arXiv:1701:01779v2, Apr. 14, 2017, 9 pages.

Patel, Giving Lens New Reading Capabilities in Google Go, Sep. 4, 2019, https://ai.googleblog.com/search/label/Augmented%20Reality, retrieved on Dec. 10, 2019, 19 pages.

Simon et al., "Hand Keypoint Detection in Single Images Using Multiview Bootstrapping", arXiv:1704.07809v1, Apr. 25, 2017, 9 pages.

Sunyoto et al., "Wrist Detection Based on a Minimum Bounding Box and Geometric Features", https://doi.org/10.1016/j.jksuci.2018.05.005, Journal of King Saud University—Computer and Information Sciences, 2018, 8 pages.

TensorFlow, "TensorFlow Lite on GPU", https://www.tensorflow.org/lite/performance/gpu_advanced, retrieved on Dec. 10, 2019, 11 pages.

Ungureanu et al., "Toward Unconstrained Palmprint Recognition on Consumer Devices: A Literature Review", arXiv:2003.00737v1, Mar. 2, 2020.

Yan et al., "A Neural Network Model for Learning 3D Object Representations Through Haptic Exploration", Frontiers in Neurorobotics, vol. 15, Article 639001, 2021, pp. 1-15.

Zhang et al., "MediaPipe Hands: On-device Real-time Hand Tracking", arXiv:2006.10214v1, Jun. 18, 2020, 5 pages.

Zhu et al., "A Two-stage Detector for Hand Detection in Ego-centric Videos", 2016 IEEE Winter Conference on Applications of Computer Vision (WACV), 2016, pp. 1-8, 9 pages.

* cited by examiner

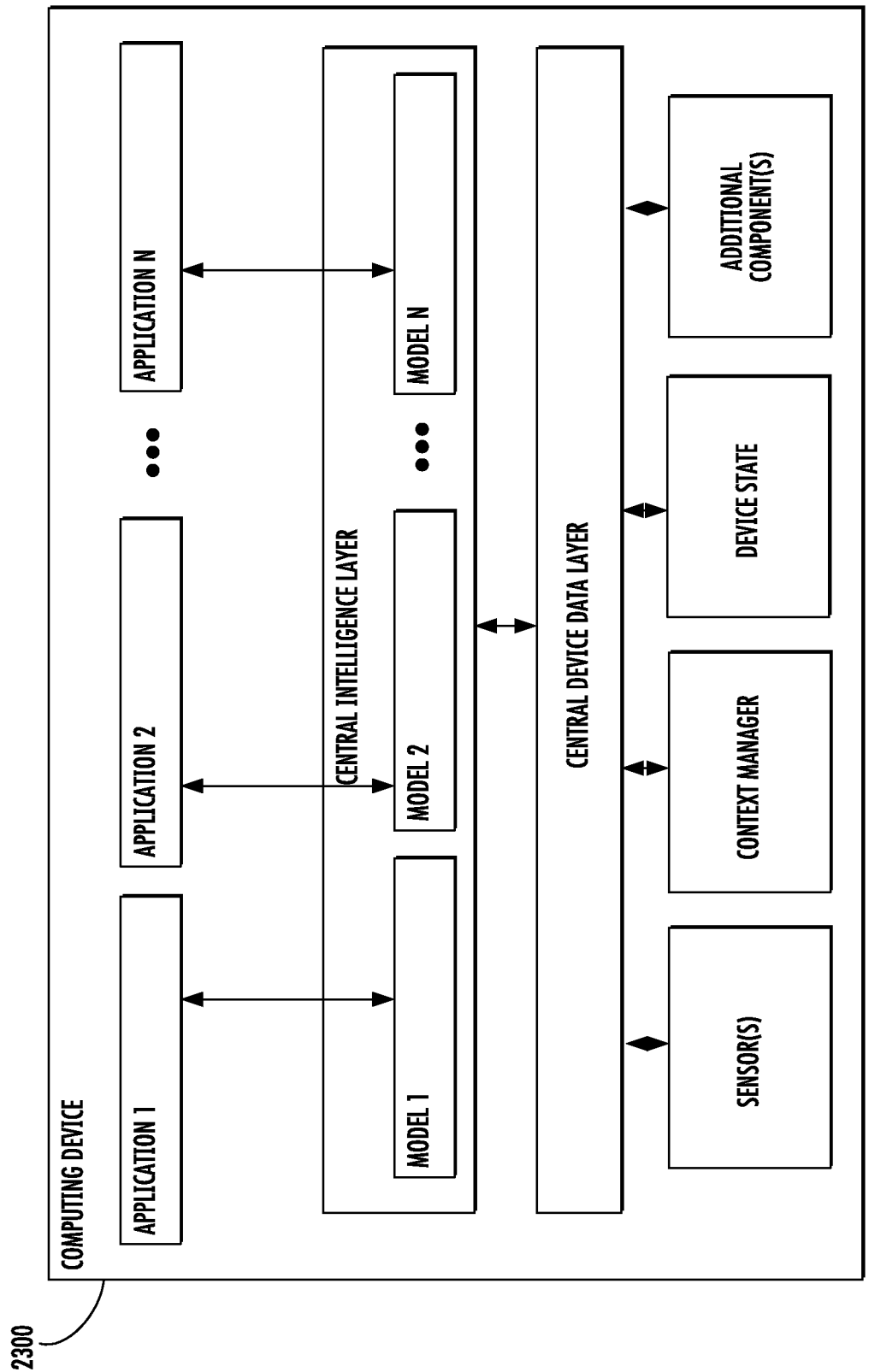

SCALABLE REAL-TIME HAND TRACKING

PRIORITY CLAIM

The present application is a continuation of U.S. application Ser. No. 16/709,128 having a filing date of Dec. 10, 2019. U.S. application Ser. No. 16/709,128 is hereby incorporated by reference in its entirety.

FIELD

The present disclosure relates generally to detecting and tracking hands in imagery.

BACKGROUND

The ability to perceive and visualize the shape and motion of hands in images by computers can be useful in guiding the performance of a large number of different tasks in a multitude of technological domains. Hand tracking and perception, however, can include complex computer vision tasks that often require powerful desktop environments. In many state-of-the-art hand tracking and perception systems, for example, complex systems are often designed to perform detection and tracking using specially-designed and highly-engineered systems. However, such systems can often rely on computationally expensive tasks to detect features and enable hand tracking. The hardware requirements of such systems typically do not enable mobile applications.

SUMMARY

Aspects and advantages of embodiments of the present disclosure will be set forth in part in the following description, or can be learned from the description, or can be learned through practice of the embodiments.

One example aspect of the present disclosure is directed to a computer system for hand tracking. The computing system includes one or more processors and one or more non-transitory computer-readable media that collectively store a machine-learned palm detection model, a machine-learned hand landmark model, and one or more non-transitory computer-readable media that collectively store instructions that, when executed by one or more computing devices, cause the computer system to perform operations. The machine-learned palm detection model is configured to detect palms in image frames input to the machine-learned palm detection model and generate a respective oriented bounding box indicative of one or more palm positions within a corresponding image frame. The machine-learned hand landmark model is configured to obtain data indicative of an image frame region corresponding to the respective oriented bounding box, detect a plurality of hand landmark positions within the image frame region, and perform key-point localization to generate three-dimensional coordinates corresponding to the plurality of hand landmark positions. The operations include obtaining data indicative of a first image frame, inputting the data indicative of the first image frame into the machine-learned palm detection model, and receiving, as an output of the machine-learned hand landmark model, data indicative of the three-dimensional coordinates corresponding to the plurality of hand landmark positions within the first image frame.

Another example of the present disclosure is directed to a computer implemented method for hand tracking that includes inputting, by one or more computing devices, an image frame into a machine-learned palm detection model configured to detect a palm in the image frame and generate an oriented bounding box indicative of a palm position within the image frame. The method includes receiving, by the one or more computing devices as an output of the machine-learned palm detection model in response to the image frame, bounding box data indicative of the oriented bounding box for the image frame. The method includes inputting, by the one or more computing devices, data indicative of an image frame region corresponding to the oriented bounding box for the image frame into a machine-learned hand landmark model configured to detect a plurality of hand landmark positions within the image frame region perform key-point localization to generate three-dimensional coordinates corresponding to the plurality of hand landmark positions. The method includes receiving, by the one or more computing devices as an output of the machine-learned hand landmark model, data indicative of the three-dimensional coordinates for the plurality of hand landmark positions within the image frame.

Yet another example aspect of the present disclosure is directed to a computer system including a machine-learned hand tracking system including a machine-learned palm detection model and a machine-learned hand landmark model. The machine-learned palm detection model is configured to detect palms in image frames input to the machine-learned palm detection model and generate a respective oriented bounding box indicative of one or more palm positions within a corresponding image frame. The machine-learned hand landmark model is configured to detect a plurality of hand landmark positions within an image frame region and perform key-point localization to generate three-dimensional coordinates corresponding to the plurality of hand landmark positions. The computer system includes one or more processors and one or more non-transitory computer-readable media that store instructions, that when executed by the one or more processors, cause the one or more processors to perform operations. The operations include obtaining training data including a first set of image frames annotated with ground truth data that indicates hand landmark positions for one or more physical hands depicted within the first set of images frames and a second set of image frames annotated with ground truth data that indicates hand landmark positions for one or more rendered synthetic hand models that are depicted within the second set of images frames. The operations include inputting, into the machine-learned hand tracking system, the training data, and determining, in response to the training data, a loss function associated with one or more hand landmark positions detected by the machine-learned hand landmark model relative to the ground truth data that indicates hand landmark positions for one or more physical hands depicted within the first set of images frames and the ground truth data that indicates hand landmark positions for one or more rendered synthetic hand models depicted within the second set of images frames. The operations include backpropagating the loss function associated with the one or more hand landmark positions to the machine-learned hand tracking system to train the machine-learned hand tracking system.

Other aspects of the present disclosure are directed to various systems, apparatuses, non-transitory computer-readable media, user interfaces, and electronic devices.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 21C depicts a block diagram of an example computing device according to example embodiments of the present disclosure.

Figure 1:
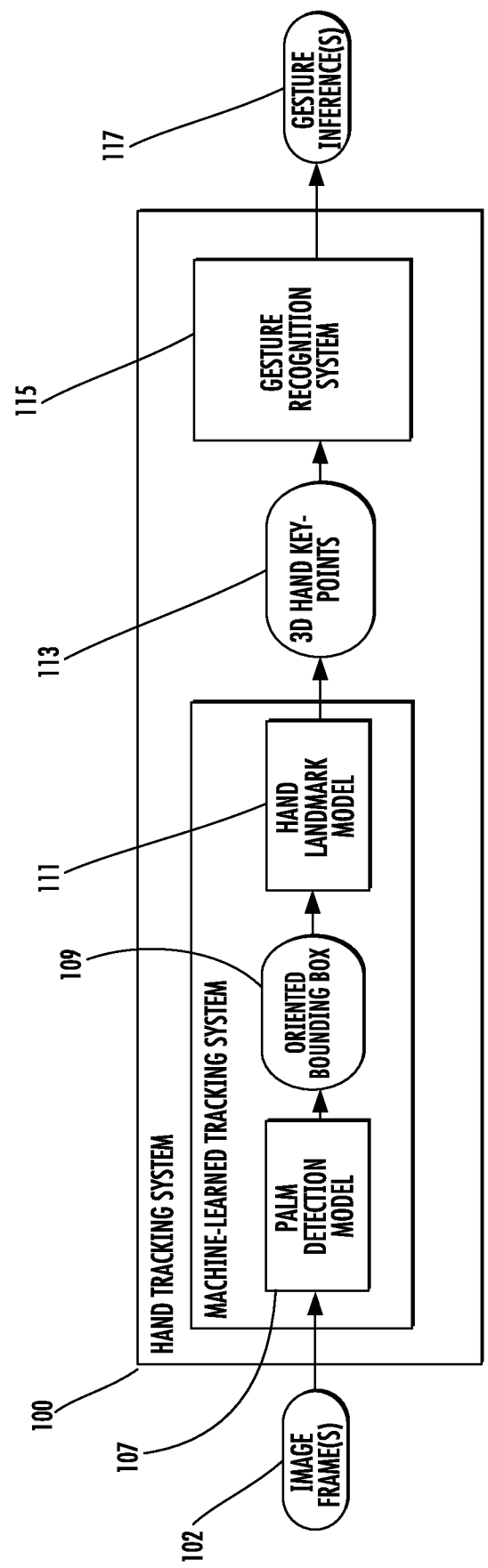
FIG. 1 depicts a block diagram of an example hand tracking system according to example embodiments of the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to computing systems and methods for hand tracking using a machine-learned system for palm detection and key-point localization of hand landmarks. In particular, example aspects of the present disclosure are directed to a multi-model hand tracking system that performs both palm detection and hand landmark detection. Given a sequence of image frames, for example, the hand tracking system can detect one or more palms depicted in each image frame. For each palm detected within an image frame, the machine-learned system can determine a plurality of hand landmark positions of a hand associated with the palm. The system can perform key-point localization to determine precise three-dimensional coordinates for the hand landmark positions. In this manner, the machine-learned system can accurately track a hand depicted in the sequence of images using the precise three-dimensional coordinates for the hand landmark positions. This three-dimensional hand landmark tracking can facilitate the ability to both perceive the shape and motion of hands in order to provide viable solutions in a number of technological domains and platforms. By way of example, a machine-learned hand tracking system as described may be used to implement sign language applications and hand gesture controls, as well as to overlay digital content and information on top of the physical world in augmented reality applications. The machine-learned hand tracking system can provide accurate and robust real-time hand perception and tracking even in the presence of occlusions and a lack of high contrast patterns which are often present with the depiction of hands in imagery.

In accordance with example embodiments, a machine-learned hand tracking system can include one or more machine-learned palm detection models and one or more machine-learned hand landmark models. In some implementations, the palm detection model and/or the hand landmark model can be machine-learned models, such as, for example, artificial neural networks (hereinafter "neural networks) such as convolutional neural networks. Each of the machine-learned palm detection model and the machine-learned hand landmark model can be configured to process input image data. For example, the image data can include input image frames including two-dimensional image frames or three-dimensional image frames. For example, the image frames can include images captured by a camera (e.g., visible spectrum camera, infrared camera, hyperspectral camera, etc.). The images can be expressed in any number of different color spaces (e.g., greyscale, RGB, CMYK, etc.). As another example, the input image frames can include images generated by a Light Detection and Ranging ("LIDAR") system or a Radio Detection and Ranging ("RADAR") system. For example, the input imagery can be or include a two- or three-dimensional point cloud of detected data points. The machine-learned palm detection model(s) can be configured to detect one or more palms in an image frame (e.g., still frames and/or video) by extracting features from the image frame and estimating a bounding box(es) indicative of the position of the palm(s) in the image frame. The machine-learned hand landmark model can perform key-point localization within a region defined by the bounding box to generate three-dimensional coordinates corresponding to a plurality of hand landmark positions within the image frame.

In accordance with example aspects of the present disclosure, the machine-learned palm detection model can be configured to detect a position of one or more palms in an image frame and estimate one or more bounding boxes indicative of the positions of the palms in the image frame. For example, the palm detection model can extract features associated with palms from image frames to detect and predict palm positions. In some examples, the machine-learned palm detection model can generate an oriented bounding box indicating the position of a hand or palm within an image frame. In some examples, the machine-learned palm detection model can expand a bounding box associated with a palm in order to identify a possible hand location. For instance, the palm detection model can estimate one or more first bounding boxes indicative of one or more detected palms in an image frame and expand and/or shift the one or more first bounding boxes to generate one or more second bounding boxes indicative of the location of an entire hand in the image frame. The palm detection model can estimate an oriented bounding box in various ways. For example, the palm detection model may estimate the oriented bounding box based at least in part on an estimation of rigid objects in the image frame.

A bounding box may be used to indicate the position of a palm and/or hand in various ways. A bounding box can include any bounding shape or combination of bounding shapes to indicate the position of a palm or hand. A bounding box can include two-dimensional shapes and/or three-dimensional shapes (e.g., depending on the dimensional structure of the input image frame). A bounding box can identify a set of pixels (or voxels) in the image frame that correspond to the location of the palm or hand within the image. A bounding box shape can be a polygonal shape (e.g., a box or cube), a curved shape (e.g., circle or oval), or an arbitrary shape (e.g., a segmentation mask that identifies a specific set of pixels or voxels that encompass the detected palm). As another example, an oriented bounding box can be used.

According to an exemplary implementation, a machine-learned palm detection model can be configured to transform an input image frame into an image of a pre-defined size (e.g., 800×800 pixels, 256×256, etc.). Such transformation of the input image frame to a pre-defined scale can preserve the aspect ratio of the image frame, which can aid in generating the bounding boxes in some instances. The machine-learned palm detection model can be configured to input the scaled image frame and generate bounding boxes for the scaled input image frames. In some examples, the machine-learned palm detection model can adjust the bounding box estimations for the scaled image frame to estimate the respective bounding boxes for the unscaled input image frame.

According to some implementations, a machine-learned palm detection model can include an encoder-decoder feature extractor that is configured to extract features from images. The features may include features relating to a palm, hand, as well as information indicative of a context for each of the image frames. For example, the encoder-decoder feature extractor can be configured to extract features indicative of any of the following: the presence and/or position of a human hand in the image frame, the presence and/or position of an arm in the image frame, the presence and/or position of a body in the image frame, or the presence and/or position of a face in the image frame. In some examples, the palm detection model can additionally or alternatively use contextual features to detect palms. For instance, in addition to features associated with a human hand or palm, the model can extract features associated with an arm, body, face, and/or other personal features in the image frame that can provide contextual information. The palm detection model can use the contextual information associated with other features to aid in estimating the position of a palm within an image frame. As one example, the oriented bounding box can be estimated based at last in part on the one or more contextually aware features extracted from the image frame.

By initially detecting palms, rather than an entire hand, complex computer vision tasks at early stages of the machine-learned system may be avoided. Hands can have a variety of different sizes and may lack high contrast features, which can result in more computationally and time-intensive detection techniques. Palms, however, are typically smaller, have a relatively consistent shape, and have less variable aspect rations, such that they may be more computationally efficient to detect than an entire hand, Accordingly, a palm detection model can be provided at an early stage of the machine-learned system to provide an efficient and accurate mechanism for focusing the system on important regions within imagery.

An oriented bounding box can used to accurately place and orient the palm or hand to enable the machine-learned hand landmark model to accurately predict a plurality of hand landmark positions within the image frame. Using an accurately oriented bounding box can reduce data augmentations for determining the hand landmark positions in an image frame. By way of example, an oriented bounding box can be generated at least in part by aligning the center of the wrist within the palm and a metacarpophalangeal joint of a middle finger with a y-axis of the image frame. The machine-learned palm detection model can be configured to generate the oriented bounding box based at least in part on the one or more contextually aware features extracted from the image frame.

According to some aspects of the present disclosure, a machine-learned hand landmark model of the hand tracking system can be configured to generate image data for an image frame region by cropping a corresponding image frame based at least in part on the respective oriented bounding box generated by the palm detection model. In some examples, a separate image cropping component can be used to crop the corresponding image frame and provide it as an input to the machine-learned hand landmark model. The machine-learned hand landmark model can detect hand landmark positions within the image frame region and perform key-point localization to generate three-dimensional coordinates corresponding to the plurality of hand landmark positions within the image frame. In some examples, the machine-learned hand landmark model can include one or more convolutional neural networks configured to determine three-dimensional coordinates corresponding to the plurality of hand landmark positions using one or more regression techniques and/or algorithms. The three-dimensional coordinates can be used to initiate specific functionalities based on the detection and tracking of hands, for example, gesture recognition.

In some implementations, the machine-learned hand landmark model can be configured to obtain image data or data indicative of an image frame region corresponding to the respective oriented bounding box as input. According to some implementations, an image cropping component or other portion of the tracking system can generate image data for an image frame region by cropping the corresponding image frame based at least in part on the respective orientated bounding box. The tracking system can orient and/or crop an image frame based on the respective oriented bounding box to accurately display (or focus) the palm or hand in the image frame. In some examples, the tracking system can rotate the image frame region based on the orientation of the bounding box corresponding to hands or palms. In some examples, the tracking system can scale the image frame region to a pre-defined sized image frame region (e.g., 265×265 pixels). These transformations (e.g., rotation, scaling, cropping, or orienting) can potentially reduce the amount of data that is processed by the machine-learned hand landmark model in detecting hand landmarks. In some examples, the image frame region can be generated by an image cropping component that is part of the machine-learned palm detection model by cropping and/or orienting the corresponding image frame. In other examples, a separate image cropping component can be used. Generating an accurately cropped and/or oriented image to detect hand landmark positions can improve the accuracy and efficiency of the hand landmark model by reducing the need for data augmentations.

The hand landmark model can detect a plurality of hand landmark positions (e.g., fingers, thumb, knuckles, joint positions, etc.) within the image frame region. The hand landmark positions can be detected based in part on the bounding box in some examples. The hand landmark model can detect hand landmark positions based on the position of the palm or hand in the image frame and/or an orientation of the respective bounding box. In some examples, the hand landmark positions (e.g., joints within fingers, between the palm and fingers, etc.) can be determined based on the location of the palm and the orientation of the palm in the image frame. For example, the position of hand landmarks can be based on the position and orientation of the palm or hand in the image.

In some examples, a machine-learned hand landmark model can detect landmarks based at least in part on hand geometry of a depicted hand. For instance, the model can identify a position of a center of a wrist attached to the palm in an image frame and one or more extracted features indicative of hand geometry within the image frame. Hand geometry can include biometrics and other features that can identify the shape of a hand. Hand geometry can include features of a hand along various dimensions (e.g., length between knuckles, width of fingers, width of knuckles, width of the palm, length of the palm, length of fingers, etc.). In some examples, one or more features indicative of hand geometry of a palm or hand detected in an image frame can be extracted. For example, the hand landmark model can detect hand landmark positions by identifying features extending from a wrist feature towards one or more finger features. The feature extension can be identified in a direction from the center of a wrist connected to the palm in the image frame. In some examples, hand landmark positions can be identified using one or more hand geometry features, such as for example, by detecting a thumb in an image frame, and using the detected thumb to detect a plurality of hand landmarks within the image frame.

According to example embodiments, the machine-learned hand landmark model can be configured to perform key-point localization to generate three-dimensional coordinates corresponding to the plurality of hand landmark positions. For example, the machine-learned hand landmark model can detect a plurality of hand landmark positions within an image frame region, and generate three-dimensional coordinates corresponding to the hand landmark positions. The plurality of hand landmark positions within the image frame region can be mapped to coordinates within the corresponding image frame. In this manner, the hand landmark model can detect hand landmark positions in a cropped and/or oriented image frame region and map the positions to a corresponding input image frame, generating the three-dimensional coordinates. The image frame region can be obtained by cropping or orienting the corresponding image frame based at least in part on the respective oriented bounding box. As another example, the machine-learned hand landmark model can detect a plurality of hand landmark positions within an image frame and map the plurality of hand landmark positions as three-dimensional coordinates within the image frame. In some examples, the machine-learned hand landmark model can use a learned consistent internal hand pose representation to perform key-point localization.

A hand tracking system in example embodiments can selectively invoke the palm detection model. For example, the hand tracking system can perform hand detection using the machine-learned hand landmark model. If a hand is detected by the hand landmark model, the system can perform keypoint localization without invoking the palm detection model to identify a palm in the image frame. If a hand is not detected by the hand landmark model, the tracking system can provide the image frame to the palm detection model for palm detection. In some examples, the machine-learned hand landmark model can determine whether a hand is present in an image frame based in part on generated tensor data for an input image frame or image frame region. By way of example, the machine-learned hand landmark model can be configured to detect hands in the image frame and output a confidence value (e.g., a pre-defined range between 0 and 1 or between 0 and 100) indicative of a probability that a hand is present. If the confidence value satisfies a pre-defined threshold, the hand landmark model can generate and/or provide data indicative of three-dimensional coordinates corresponding to hand landmark positions within the image frame. If the confidence value does not satisfy a pre-defined threshold, the hand landmark model can input the corresponding image frame into the palm detection model. This technique can potentially reduce the number of executions of the machine-learned palm detection model over a set of images, thereby increasing the efficiency of the system and reducing the computational resources utilized by the hand tracking system.

According to some implementations, the machine-learned hand landmark model can infer the location of a palm or hand in a subsequent image frame based on a detected position of the palm or hand in a current image frame. The location of a hand in a subsequent video frame can be predicted based on the hand landmark positions within a current image frame or image frame region. In some examples, the machine-learned hand landmark model can orient and/or crop the subsequent image frame based on the predicted location of the hand in the subsequent image frame. In this manner, image data for the subsequent image frame can be generated that indicates the likely position of the hand based on the position of the hand in the current image frame. The machine-learned hand landmark model can proceed by detecting a plurality hand landmarks within the subsequent image frame and generate three-dimensional coordinates corresponding to the plurality of hand landmarks In some examples, the hand landmark model can determine a confidence value associated with a hand detection prediction for a subsequent image frame. If the confidence value for a prediction for the subsequent image frame satisfies a pre-defined threshold, the hand landmark model can perform key-point localization to determine three-dimensional coordinates corresponding to a plurality of hand landmark positions within the image frame. If the confidence value does not satisfy the threshold, the subsequent image frame can be provided to the palm detection model to detect a palm location. By applying the machine-learned palm detection model selectively based on confidence values associated with hand detections, potential compute cycles associated with the palm detection model can be reduced.

A hand tracking system can be configured to initiate various functionalities based on the detection and tracking of hands. By way of example, the hand tracking system can initiate a functionality at one or more computing devices in response to detecting a gesture within one or more image frames. As another example, the hand tracking system can generate various displays or renderings based on the hand tracking. As a specific example, the hand tracking system can include a gesture recognition system that can identify a gesture in an image frame based at least in part on three-dimensional coordinates generated by the hand landmark model for a plurality of hand landmark positions. In some examples, sets of three-dimensional coordinates generated by the machine-learned hand landmark model can be utilized in a mapping to determine whether pre-defined gestures are present in an image frame. For example, a state of a hand, finger(s), etc. can be derived from the three-dimensional coordinates of a detection and mapped to a set of pre-defined gestures. This approach can provide for accurate gesture recognition while reducing the amount of computational resources often associated with gesture recognition processes.

A gesture recognition system is provided in example embodiments that is configured to recognize gestures in image frames. The gesture recognition system can be configured to identify a gesture based at least in part on three-dimensional coordinates corresponding to a plurality of hand landmark positions within an image frame. According to example implementations, the gesture recognition system can obtain data indicative of a hand skeleton using three-dimensional coordinates corresponding to a plurality of hand landmark positions within an image frame. A set of finger states (e.g., bent, straight, oriented, etc.) associated with each finger of the hand skeleton can be determined. The finger states can be generated based at least in part on accumulated angle of joints associated with each finger of the hand skeleton. The accumulated angle of joints can be determined based at least in part on the three-dimensional coordinates corresponding to the plurality of hand landmark positions such as joints, knuckles, fingers, and/or thumbs. The gesture recognition system can associate a gesture detected in an image frame to one or more pre-defined gestures at least in part by mapping the determined set of finger states to a set of pre-defined gestures. Using a pre-defined set of gestures based on hand landmark positions as described can increase accuracy and increase the efficiency of gesture recognition in some examples. By mapping a set of finger states to pre-defined gestures, a system can be customized to a specific set of gestures (e.g., American Sign Language, Chinese sign language, etc.). A gesture recognition system may include a mapping system including a data store of mappings between finger states and pre-defined gestures. Additionally or alternatively, the gesture recognition system may include one or more machine-learned classifiers that are trained to identify pre-defined gestures based at least in part on three-dimensional hand coordinates generated by the hand landmark model.

A hand tracking system in accordance with example embodiments can be trained to determine three-dimensional coordinates corresponding to a plurality of hand landmark positions within an image frame. The hand tracking system can be trained to determine three-dimensional coordinates corresponding to a plurality of hand landmark positions within an image frame and/or to detect whether a hand is present in the image frame. A training computing system can obtain training data including image frames annotated with ground truth data that indicates hand landmark positions for one or more hands depicted within the images frames. The training data can be annotated with ground truth data that indicates three-dimensional coordinates corresponding to hand landmark positions. In some examples, the training data can be annotated to indicate depth information associated with an image depth map corresponding to the image frames. The three-dimensional coordinates corresponding to the hand landmark positions can include a z-value (or depth value) taken from an image depth map for the set of image frames. A loss function can be determined based on errors between hand landmark positions detected by the machine-learned hand landmark model and ground truth data that indicates hand landmark positions. The loss function can be backpropagated to the machine-learned hand tracking system to train the palm detection model and/or the hand landmark model. The training system can modify at least a portion of the palm detection model and/or the machine-learned hand landmark model based at least in part on the loss function.

In some examples, the hand tracking system can additionally be trained based on predictions of whether a hand is present in an image frame. Training data can be provided that has been annotated to indicate whether a hand is present in an image frame. A loss component can be calculated and used to train the hand landmark model, for example, based on predictions associated with hand presence. In some examples, the machine-learned hand landmark model can generate an additional interpretable output indicative of whether a hand is present in an image frame. The output indicating whether a hand is detected can be a separate interpretable output from the output including three-dimensional coordinates in example embodiments. In this manner, the annotations in the training data as to hand presence can be compared to the interpretable hand detection output. In some examples, the training data can include a third set of image frames annotated with ground truth data that indicates whether a hand is present in an image frame. Additionally or alternatively, the first set of image frames of training data and/or the second set of image frames of training data can be annotated with ground truth data that indicates whether a hand is present in the image frames.

A mixed training schema is provided in example embodiments to train the hand tracking system. A training computing system can obtain training data including a first set of image frames annotated with ground truth data that indicates hand landmark positions for one or more physical hands depicted within the first set of images. The training data can include a second set of image frames annotated with ground truth data that indicates hand landmark positions for one or more rendered synthetic hand models that are depicted within the second set of annotated images frames. The image frames depicting a synthetic hand model can include a computer-generated hand model rendered over a plurality of backgrounds. For example, a hand model can be rendered in a variety of poses and mapped to a plurality of hand landmark positions. In some examples, training data including synthetic hand models can be annotated with ground truth data that indicates three-dimensional coordinates corresponding to a plurality of hand landmark positions. The three-dimensional coordinates can include a z-value (or depth value) taken from an image depth map for the second set of image frames or can be generated using a computer-generated hand model. Using image frames comprising rendered synthetic hand models annotated with ground truth data indicating hand landmark positions can improve system accuracy in recognizing hand landmark positions for a variety of hand poses and backgrounds.

The training system can determine a loss function based on errors between hand landmark positions detected by the machine-learned hand landmark model and ground truth data that indicates hand landmark positions for physical hands depicted within the first set of images frames. Additionally or alternatively, the loss function can be determined based on errors between the detected landmark positions and ground truth data that indicates hand landmark positions for a rendered synthetic hand models depicted within the second set of images frames. The loss function can be backpropagated to the machine-learned hand tracking system to train the palm detection model and/or the hand landmark model. The training system can modify at least a portion of the palm detection model and/or the machine-learned hand landmark model based at least in part on the loss function. Using mixed training data that includes image frames that depict physical hands and image frames that depict rendered synthetic hand models can increase the accuracy of the machine-learned system. Mixed training data can enable the machine-learned hand tracking system to better understand hand geometry and internal hand pose representation, making the system robust to even partially occluded or partially visible hands (e.g., handshakes, etc.).

The use of synthetic hand models in training can provide a larger number of hand poses on which to train, and can provide additional supervision on the nature of hand geometry. The synthetic hand model can be rendered over various backgrounds and mapped to corresponding three-dimensional coordinates. This can enable the system to be trained over a diverse set of backgrounds with many hand poses. Purely synthetic data, however, may not always generalize well to the real-world. Accordingly, the use of a mixed training schema can provide a technique that generalizes well to the real-world, while providing a diverse set of training data.

Systems and methods in accordance with the disclosed technology provide a number of technical effects and benefits. As one example, the systems and methods described herein can enable a hand tracking system to optimize the resources consumed by a computing system. Traditional hand tracking systems often rely on powerful desktop environments for hand tracking as they attempt to detect a complete hand in a full image frame. Embodiments in accordance with the disclosed technology, however, can initially detect a palm, and thereby avoid complex hand perception tasks at the early stages of the machine-learned hand tracking system. Palms, having a smaller and relatively consistent shape, may be more amenable to detection than hands, which tend to vary greatly in size and lack high contrast patterns. Thus, detecting palms rather than entire hands can reduce computational resources of the hand tracking system. As such, example embodiments can be implemented for real-time applications on mobile computing devices such as smartphones.

As another example, the systems and methods as disclosed herein can enable more accurate hand perception and tracking. More particularly, a machine-learned model can be trained to predict hand landmarks more accurately by searching for hand landmarks within a pre-defined region that has been accurately cropped and oriented to provide a learned consistent hand pose representation. By focusing the hand landmark model within a pre-defined region, the accuracy and efficiency of the system can be increased.

As another example, the systems and methods for hand tracking as disclosed herein can be scaled to detect multiple hands. More particularly, a machine-learned model can be trained to detect multiple hands in an image frame, even when hands or hand landmarks are occluded (e.g., handshakes occluding palms and fingers). Since palms have a relatively consistent size, detecting palms initially enables the detection of multiple palms, even if the palms are occluded. Multiple hands and their hand landmarks can be detected based on the position of the detected palms without an increase the resources required for hand perception. Thus, a machine-learned model can detect multiple hands in an image frame without using significantly more computational resources.

As such, aspects of the present disclosure can improve applications that require hand tracking and perception. For example, the present disclosure can improve gesture recognition, hand movement tracking, and other machine-learned processes by increasing the efficiency, accuracy, and scalability of the system.

In some implementations, in order to obtain the benefits of the techniques described herein, the user may be required to allow the collection and analysis of image information associated with the user or her device. For example, in some implementations, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed. As an example, a computing system can obtain image data which can indicate a hand, without identifying any particular user(s) or particular user computing device(s).

With reference now to the figures, example aspects of the present disclosure will be discussed in greater detail.

FIG. 1 depicts a block diagram of an example hand tracking system 100 according to examples embodiments of the present disclosure. The hand tracking system 100 can include both a palm detection model 107 and a hand landmark model 111. In some implementations, both the palm detection model 107 and/or the hand landmark model 111 can be machine-learned models, such as, for example, artificial neural networks such as convolutional networks.

The input image frames 102 can include two-dimensional image frames or three-dimensional image frames. For example, the image frames 102 can include images captured by a camera (e.g., visible spectrum camera, infrared camera, hyperspectral camera, etc.) or other image capture system. The images can be expressed in any number of different color spaces (e.g., greyscale, RGB, CMYK, etc.). As another example, the input image frames can include images generated by a Light Detection and Ranging ("LIDAR") system or a Radio Detection and Ranging ("RADAR") system. For example, the input image frames 102 can be or include a two- or three-dimensional point cloud of detected data points.

The palm detection model 107 can be configured to detect one or more palms in input image frames 102 (e.g., still frames and/or video) by extracting features from the image frame and estimating one or more bounding box(es) 109 indicative of the position of the palm(s) in the image frame 102. The palm detection model 107 can estimate an oriented bounding box 109 in various ways. For example, the palm detection model 107 may estimate the oriented bounding box 109 based at least in part on an estimation of rigid objects in the image frame. As one example, the oriented bounding box 109 can be estimated based at last in part on the one or more contextually aware features extracted from an image frame.

The machine-learned palm detection model 107 can generate as output an oriented bounding box 109 indicating the position of a hand or palm within an image frame. An oriented bounding box can be used to accurately place and orient the palm or hand in the image frame to enable the machine-learned hand landmark model to accurately predict a plurality of hand landmark positions within the image frame.

The machine-learned hand landmark model 111 can perform key-point localization within a region defined by the bounding box to generate three-dimensional coordinates or 3D hand key-points 113 corresponding to a plurality of hand landmark positions within the image frame. For example, in some implementations, the machine-learned hand landmark model 111 of the hand tracking system can be configured to generate image data for an image frame region by cropping a corresponding image frame based at least in part on the respective oriented bounding box 109 generated by the palm detection model 107. The machine-learned hand landmark model 111 can detect hand landmark positions within the image frame region and perform key-point localization to generate three-dimensional coordinates corresponding to the plurality of hand landmark positions within the image frame.

A gesture recognition system 115 can be included in hand tracking system 100 in some embodiments. The gesture recognition system 115 can be configured to recognize or infer gestures 117 in image frames. The gesture recognition system 115 can be configured to identify a gesture, based at least in part on three-dimensional coordinates corresponding to a plurality of hand landmark positions within an image frame. The gesture recognition system can generate one or more gesture inferences 117 that indicate one or more gestures detected in an image frame. It is noted that the gesture recognition system is depicted by way of example. In other examples, additional or alternative functionalities may be implemented. A hand tracking system may include a machine-learned tracking system without additional incorporated functionality in some embodiments.

Figure 2:
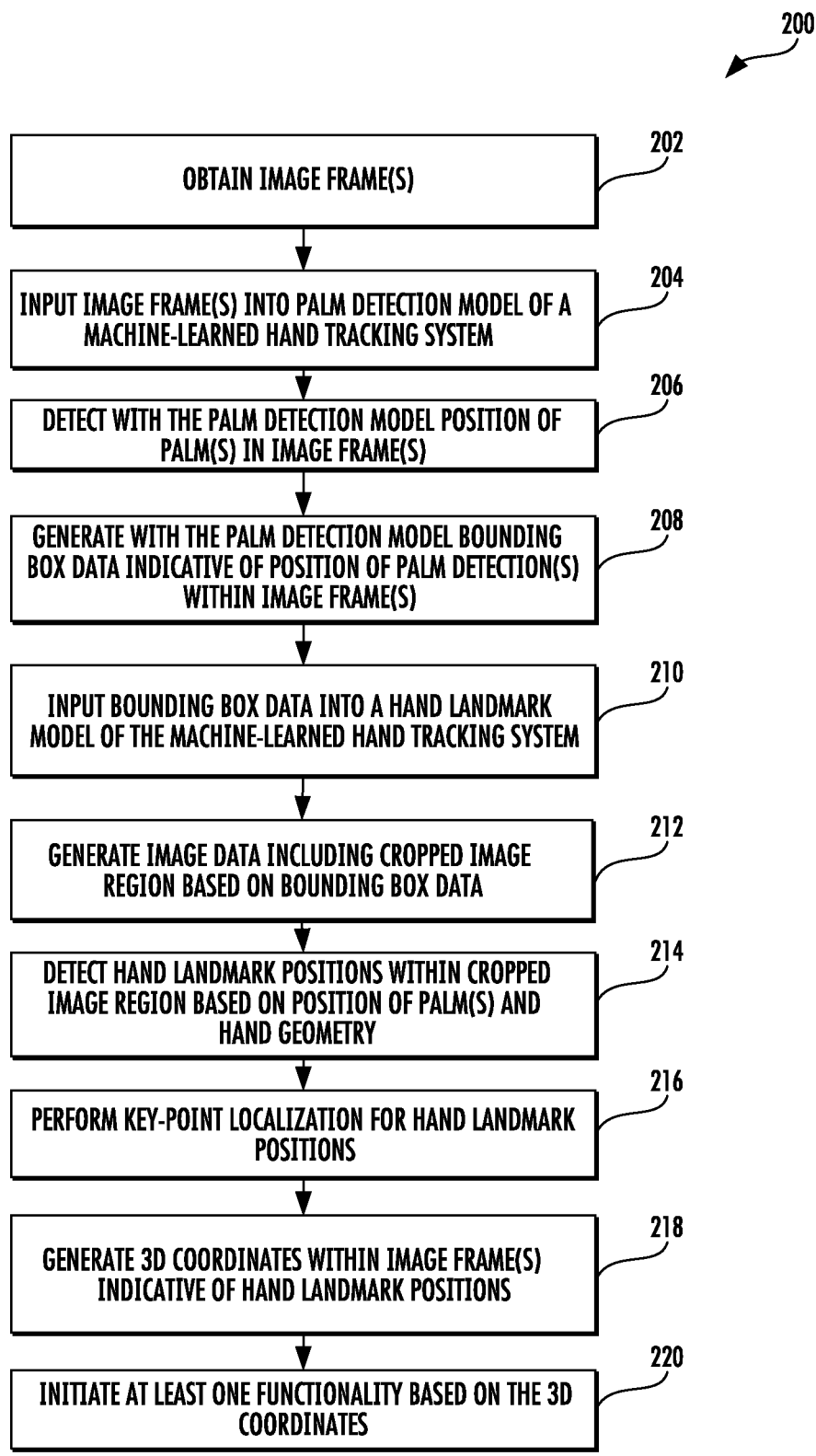
FIG. 2 depicts a flowchart illustrating an example hand tracking method using a machine-learned palm detection model and a machine-learned hand landmark model according to example embodiments of the present disclosure.
Figure 21A:
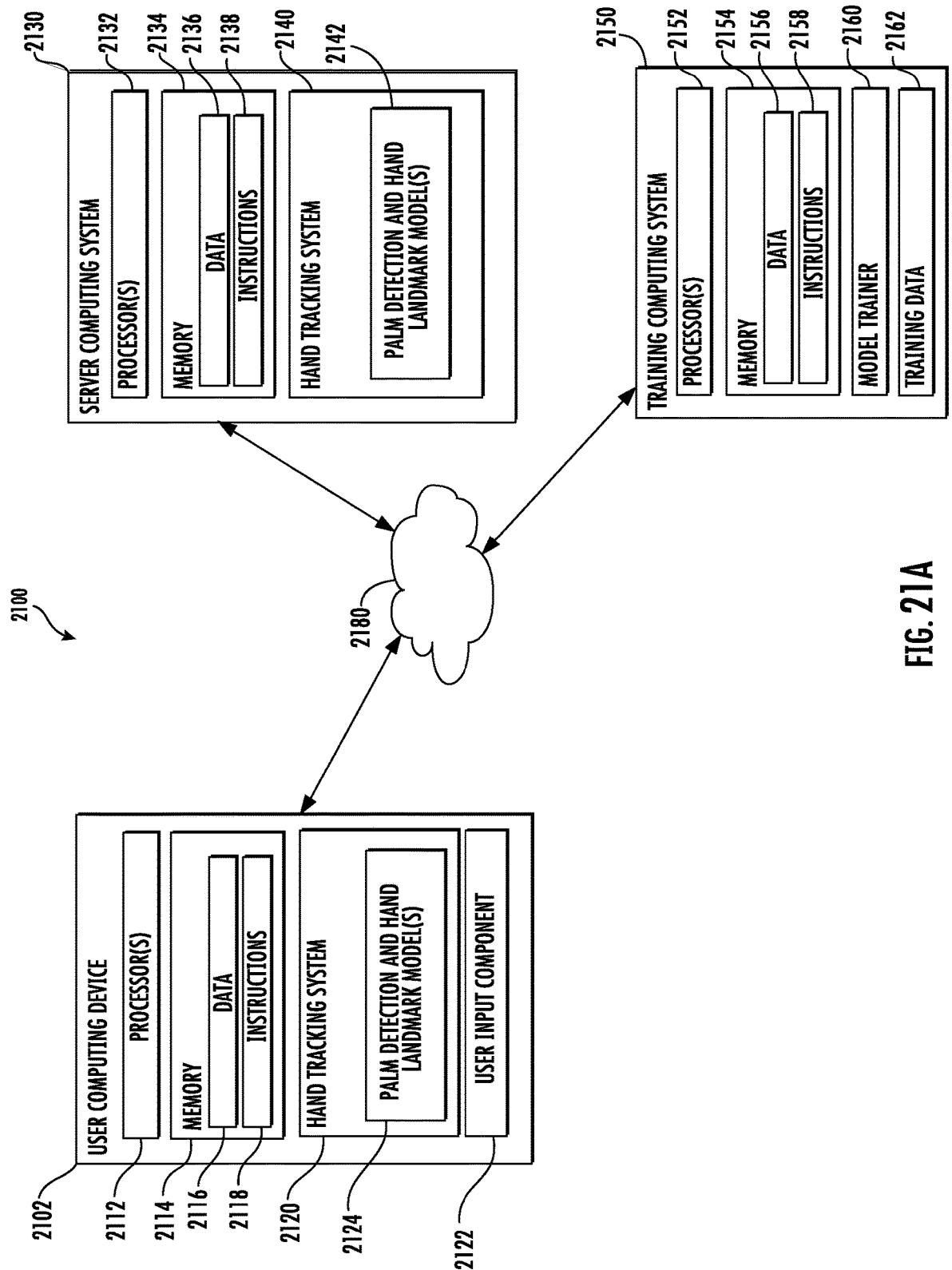
FIG. 21A depicts a block diagram of an example computing system that can be used to implement example embodiments of the present disclosure.

FIG. 2 depicts a flowchart illustrating an example method for hand tracking using a machine-learned palm detection model and a machine-learned hand landmark model. One or more portions of method 200 can be implemented by one or more computing devices such as, for example, one or more computing devices of a hand tracking computing system 2100, as illustrated in FIG. 21A. One or more portions of method 200 can be implemented as an algorithm on the hardware components of the devices described herein to, for example, tracking one or more hands depicted in imagery and initiate at least one functionality based on such tracking. In example embodiments, method 200 may be performed by or otherwise using a hand tracking system (e.g., hand tracking system 100) as described herein. One or more models may be implemented at a computing device of an internal electronics module, a removable electronics module, a local computing device, or a remote computing device as described herein. Although FIG. 2 depicts steps performed in a particular order for purposes of illustration and discussion, method 200 of FIG. 2 and methods 400, 600, 900, 1100, 1700, 1800, 1900, and 2000 described hereinafter are not limited to the particularly illustrated order or arrangement. The various steps of the methods mentioned above can be omitted, rearranged, combined, and/or adapted in various ways without deviating from the scope of the present disclosure.

At 202, input data can be obtained by the hand tracking system. Input data can include imagery such as image data, including one or more image frames 102 (e.g., pictures or video frames), such as those provided by way of example with reference to FIG. 1. The image frames can include human perceptible images and/or other types of image frames such as LIDAR and RADAR frames.

At 204, the image frames 102 can be input into the palm detection model of a machine-learned hand tracking system. In response to receiving input image frames, at 206, the palm detection model can detect one or more palms in the image frames. For example, the palm detection model can extract features associated with palms from image frames to detect and predict palm positions. In some examples, the palm detection model 107 can additionally or alternatively use contextual features to detect palms. For instance, in addition to features associated with a human hand or palm, the model can extract features associated with an arm, body, face, and/or other personal features in the image frame that can provide contextual information.

At 208, the palm detection model can generate one or more bounding boxes indicative of the positions of the one or more palms detected in the image frame. In some examples, the machine-learned palm detection model can generate an oriented bounding box indicating the position of a hand or palm within an image frame. For example, the palm detection model may estimate the oriented bounding box based at least in part on an estimation of rigid objects in the image frame. The palm detection model can generate one bounding box for each palm detected in an image frame in some examples. The palm detection model can generate bounding box data indicative of one or more bounding boxes generated for each image frame.

At 210, bounding box data generated by the palm detection model can be input to the hand landmark model of the machine-learned hand tracking system. The bounding box data generated by the palm detection model can be indicative of the position of a palm in the image frame. In some examples, the bounding box data generated by the palm detection model can be indicative of the position of a hand in the image frame.

At 212, image data for a cropped image frame region can be generated based on the one or more bounding boxes generated by the palm detection model. In some examples, a machine-learned hand landmark model of the hand tracking system can be configured to generate image data for an image frame region by cropping a corresponding image frame based at least in part on the respective oriented bounding box generated by the palm detection model. For example, the hand landmark model can orient and/or crop an image frame based on the respective oriented bounding box to accurately display (or focus) the palm or hand in the image frame. It is noted that in some examples, an image cropping or other component separate from the hand landmark model may generate image data for the cropped image region and input the image data to the hand landmark model.

At 214, the hand landmark model can detect a plurality hand landmark positions within the cropped image frame region based on a position of the palms detected in the image frame and hand geometry. In some examples, the hand landmark positions can be detected based at least in part on the bounding box data generated by the palm detection model. In some examples, the hand landmark model can detect hand landmark positions based on the position of the palm or hand in the image frame and/or an orientation of the respective bounding box.

At 216, the hand landmark model can perform key-point localization for the detected hand landmark positions. For example, the machine-learned hand landmark model can detect a plurality of hand landmark positions within an image frame region, and generate three-dimensional coordinates corresponding to the hand landmark positions.

At 218, the hand landmark model can generate three-dimensional coordinates corresponding to the plurality of hand landmark positions within the cropped image frame. In some examples, the hand landmark model can generate three-dimensional coordinates based at least in part on the plurality of hand landmark positions within the image frame region by mapping the hand landmark positions within the image frame region to coordinates within the corresponding image frame.

At 220, three-dimensional coordinates can be used to initiate one or more functionalities based on the three-dimensional coordinates. Various functionalities based on the detection and tracking of hands can be initiated, such as gesture recognition. By way of example, the hand tracking system can initiate a functionality at one or more computing devices in response to detecting a gesture within one or more image frames. Example functionalities include, but are not limited to, invoking application controls based on gesture detection, handwriting applications or sign language applications, and the generation of various displays or renderings based on the hand tracking.

Figure 3:
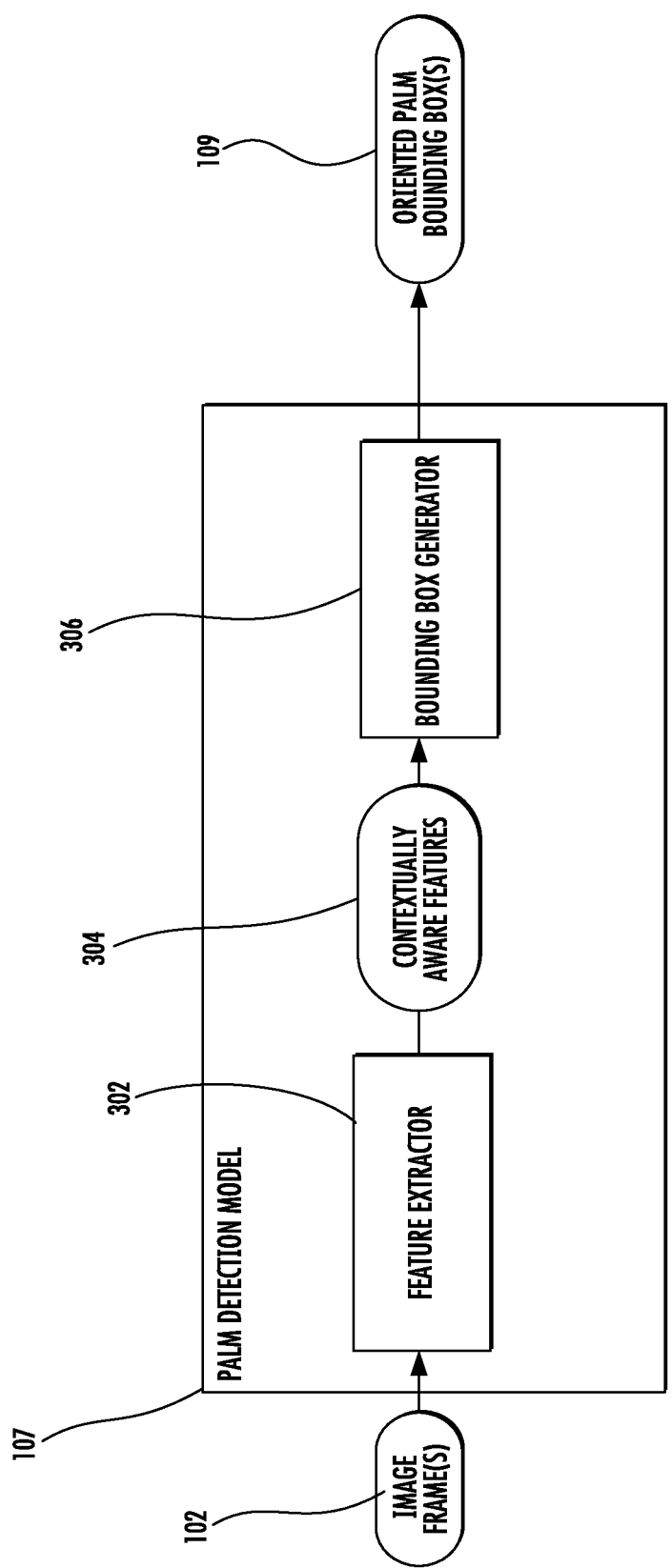
FIG. 3 depicts a block diagram of an example machine-learned palm detection model according to example embodiments of the present disclosure.

FIG. 3 depicts a block diagram of an example machine-learned palm detection model 107 according to example embodiments of the present disclosure. Machine-learned palm detection model 107 can be configured to process input image frames. The input image frames 102 can include two-dimensional image frames or three-dimensional image frames. For example, the image frames can include images captured by a camera (e.g., visible spectrum camera, infra-red camera, hyperspectral camera, etc.). The images can be expressed in any number of different color spaces (e.g., greyscale, RGB, CMYK, etc.). As another example, the input image frames can include images generated by a Light Detection and Ranging ("LIDAR") system or a Radio Detection and Ranging ("RADAR") system. For example, the input imagery can be or include a two- or three-dimensional point cloud of detected data points.

Palm detection model 107 can be configured to detect one or more palms in an image frame (e.g., still frames and/or video) by extracting contextually aware features 304 from the image frame using a feature extractor 302. For example, the palm detection model 107 can extract features associated with palms from image frames to detect and predict palm positions. In addition to features associated with a human hand or palm, the contextually aware features can include features associated with an arm, body, face, and/or other personal features in the image frame that can provide contextual information. According to some implementations, a machine-learned palm detection model 107 can include an encoder-decoder feature extractor that is configured to extract features from images. The features may include features relating to a palm, hand, as well as information indicative of a context for each of the image frames. For example, the encoder-decoder feature extractor can be configured to extract features indicative of any of the following: the presence and/or position of a human hand in the image frame, the presence and/or position of an arm in the image frame, the presence and/or position of a body in the image frame, or the presence and/or position of a face in the image frame.

Palm detection model 107 can include a bounding box generator 306 configured to generate an oriented bounding box 109 indicative of the position of a palm or hand detected in the image frame 102. As one example, the oriented bounding box can be estimated based at last in part on the one or more contextually aware features extracted from the image frame. An oriented bounding can be used to accurately place and orient the palm or hand in the image frame to enable the machine-learned hand landmark model to accurately predict a plurality of hand landmark positions within the image frame. By way of example, an oriented bounding box 109 can be generated at least in part by aligning the center of the wrist within the palm and a metacarpophalangeal joint of a middle finger with a y-axis of the image frame. As an example, the machine-learned palm detection model can be configured to generate the oriented bounding box 109 based at least in part on the one or more contextually aware features extracted from the image frame.

Figure 4:
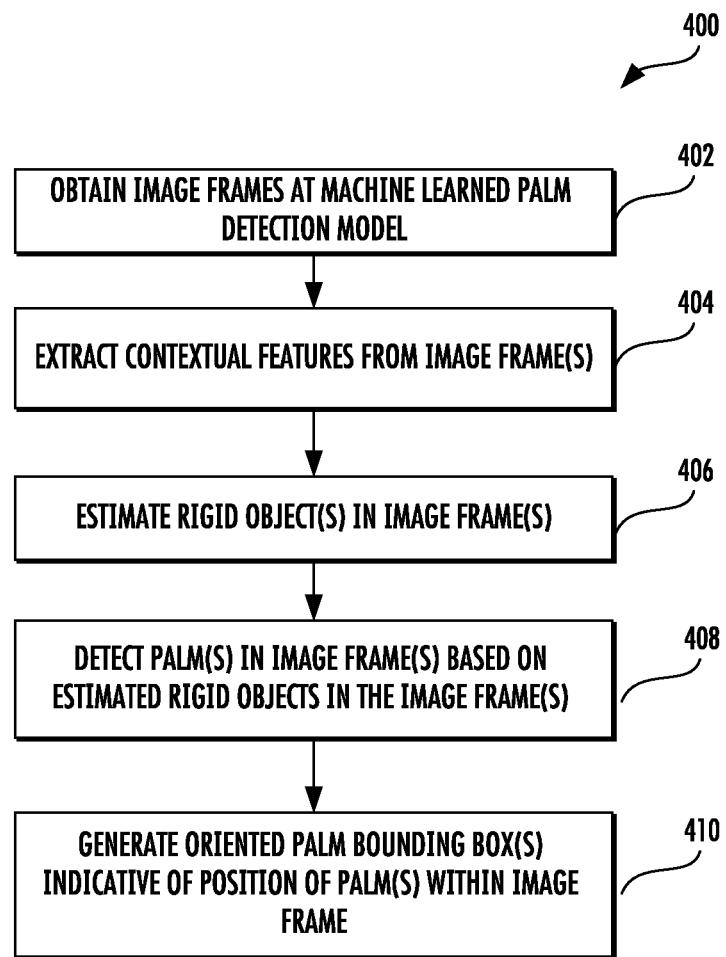
FIG. 4 depicts a flowchart illustrating an example method of generating bounding boxes using a machine-learned palm detection model according to example embodiments of the present disclosure.

FIG. 4 depicts a flowchart illustrating an example method 400 for generating bounding box(es) using a machine-learned palm detection model according to the embodiments of the present disclosure. At 402, image data such as one or more image frames 102 of image data can be obtained. For example, palm detection model 107 can obtain image data including two-dimensional image frames or three-dimensional image frames in example embodiments.

At (404), the palm detection model can extract one or more features from the input image frames 102. In some examples, the palm detection model can extract contextual features or contextually aware features from the input image frames. For example, the palm detection model 107 can extract features associated with palms from image frames to detect and predict palm positions. According to some implementations, a machine-learned palm detection model 107 can include an encoder-decoder feature extractor 302 that is configured to extract features from images. The features may include features relating to a palm, hand, as well as information indicative of a context for each of the image frames. For example, the encoder-decoder feature extractor 302 can be configured to extract features indicative of any of the following: the presence and/or position of a human hand in the image frame, the presence and/or position of an arm in the image frame, the presence and/or position of a body in the image frame, or the presence and/or position of a face in the image frame. The palm detection model 107 can use the contextual information associated with other features to aid in estimating the position of a palm within an image frame.

At (406), rigid objects in the image frame can be estimated. Rigid objects in an image frame are object detections in an image frame that have proportions or features similar to palms or hands. For example, the palm detection model 107 may extract features associated with palms from image frames to detect and predict palm positions by estimating rigid objects in the image frames indicative of palms.

At (408), the palm detection model can detect one or more palms in an image frame based at least in part on the estimation of rigid objects in the image frame.

At (410), the palm detection model can generate one or more oriented palm bounding boxes 109 that indicate the position of the one or more detected palms within the input image frame. For example, the palm detection model 107 can estimate the oriented bounding box 109 based, at least in part on an estimation of rigid objects in the image frame. In some examples, the machine-learned palm detection model can expand a bounding box associated with a palm to identify a possible hand location. For instance, the palm detection model can estimate one or more first bounding boxes indicative of one or more detected palms in an image frame and expand and/or shift the one or more first bounding boxes to generate one or more second bounding boxes indicative of the location of an entire hand in the image frame.

An oriented bounding box 109 can be used to accurately place and orient the palm or hand to enable a machine-learned hand landmark model to accurately predict a plurality of hand landmark positions within the image frame. By way of example, an oriented bounding box 109 can be generated at least in part by aligning the center of the wrist within the palm and a metacarpophalangeal joint of a middle finger with a y-axis of the image frame.

Figure 5A:
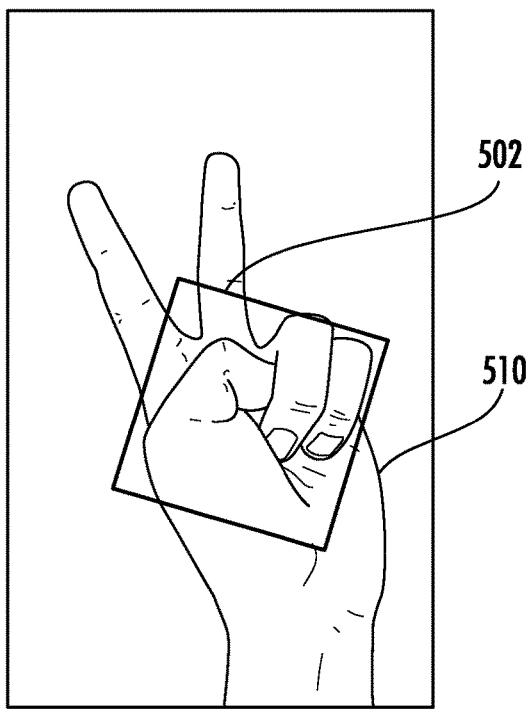
FIGS. 5A-5B depict example palm detections within image frames using a palm detection model according to example embodiments of the present disclosure.
Figure 5B:
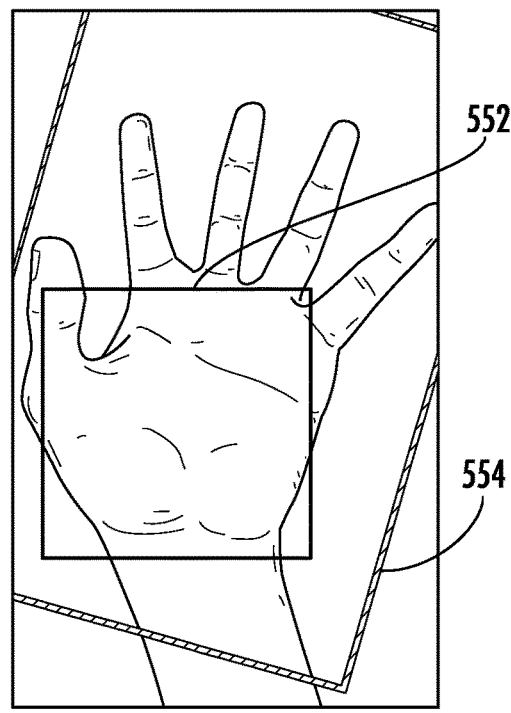

FIGS. 5A-5B depict example image frames illustrating the detection of palms using a machine-learned palm detection model according to example embodiments of the present disclosure. FIG. 5A depicts an example image frame with detections illustrating the application of a machine-learned palm detection model according to example embodiments of the present disclosure. In this example, the machine-learned palm detection model 107 detects a palm in the image frame and generates a bounding box to indicate the position of the palm in the image frame. A graphical depiction of a bounding box 502 is shown in FIG. 5A. FIG. 5A provides an example of a bounding box indicating the position of a palm 510 in an image frame.

In FIG. 5B, a detection by the machine-learned palm detection model of a palm in the image frame is depicted, including a bounding box for a hand. The palm detection model can generate bounding box data that identifies a bounding box 554 including coordinates or other data that provides an estimation of a location of a position of the hand in the image frame. In some examples, three-dimensional cartesian coordinates can be used to identify a bounding box. In other examples, pixel coordinates can be used. The machine-learned palm detection model 107 can estimate a bounding box 552 that indicates the position of the palm in the image frame, then expand bounding box 552 to generate a bounding box 554 that indicates the position of the hand in the image frame. In some instances, the machine-learned palm detection model can expand a bounding box indicative of a position of a palm in an image frame based at least in part on the actual size of the input image frame to indicate a position of a hand in the image frame. In some examples, the machine-learned palm detection model can expand the bounding box indicative of the position of the palm in an image frame based at least in part on the ratio of the size of the detected palm and the size of the input image frame. Alternatively or additionally, in some examples, a fixed scale can be used to expand the bounding box indicative of the position of the palm to indicate the position of the hand in the image frame.

Figure 6:
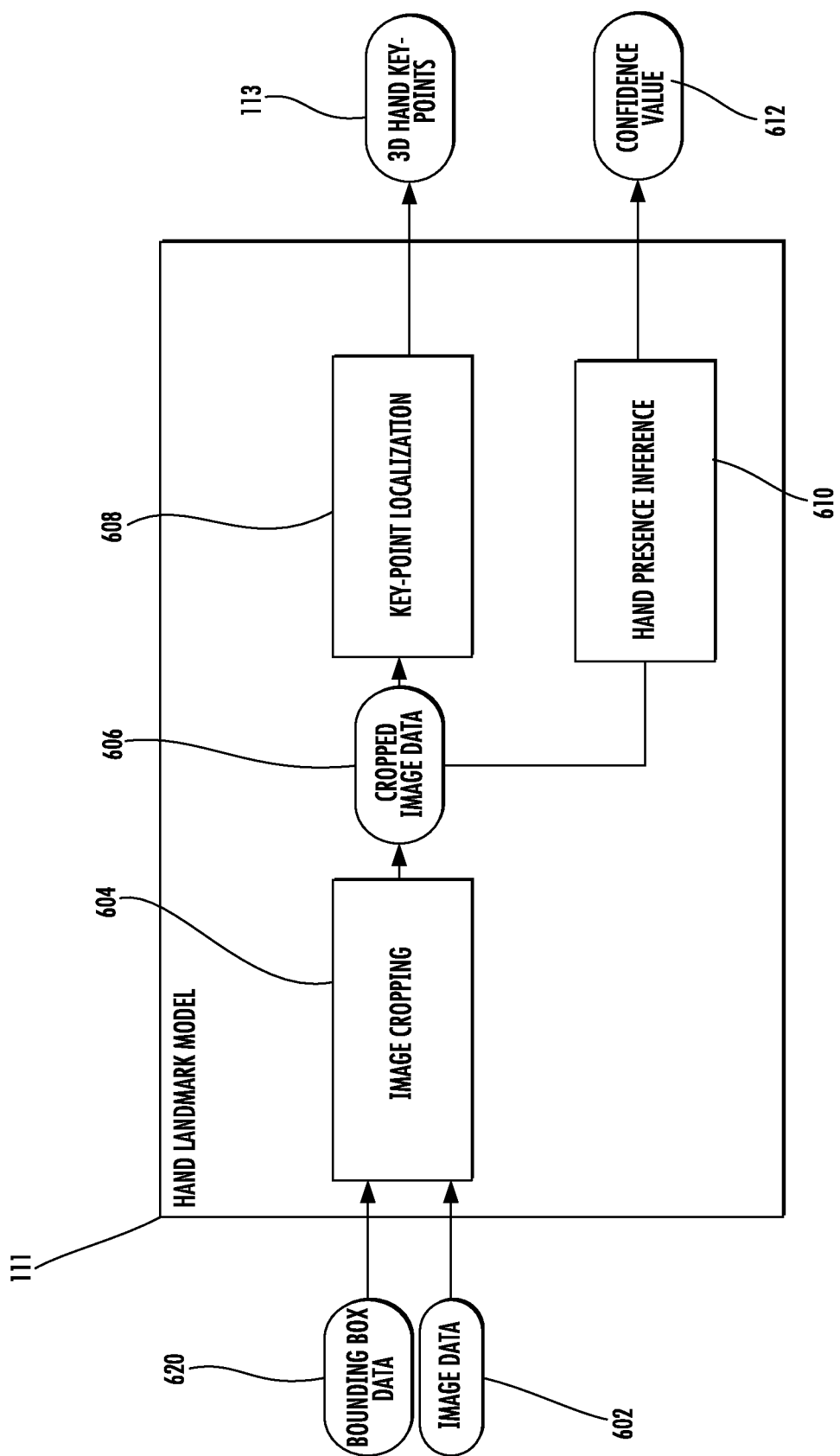
FIG. 6 depicts a block diagram of an example machine-learned hand landmark model according to example embodiments of the present disclosure.

FIG. 6 depicts a block diagram of an example machine-learned hand landmark model 111 according to example embodiments of the present disclosure. The machine-learned hand landmark model 111 can detect hand landmark positions within an image frame region and perform keypoint localization to generate three-dimensional coordinates 113 corresponding to the plurality of hand landmark positions within the image frame. In some examples, the hand landmark model can additionally generate a confidence value 612 associated with a determination as to whether an image frame depicts a hand.

Hand landmark model 111 can include an image cropping component configured to obtain image data 602 and bounding box data 620. Image cropping unit 604 can crop an image frame based at least in part on the respective orientated bounding box 109 corresponding to the image frame. In some examples, the hand landmark model 111 can generate cropped image data or cropped image frame region 606 for an image frame region by cropping the corresponding image frame based at least in part on the respective orientated bounding box 109 generated by the palm detection model 107 of the hand tracking system 100. By orienting and/or cropping an image frame based on the respective oriented bounding box, model can accurately display (or focus) the palm or hand in the image frame. In some examples, the machine-learned hand landmark model 111 can rotate the image frame region based on the orientation of the bounding box corresponding to hands or palms and/or scale the image frame region to a pre-defined sized image frame region (e.g., 265×265 pixels). In some embodiments, the hand landmark model can be configured to obtain image data or data indicative of an image frame region corresponding to the respective oriented bounding box as input. For instance, a separate image cropping component can generate an image frame region using a bounding box as described.

The hand landmark model 111 can include a key-point localization component 608 or other component configured to detect a plurality of hand landmark positions (e.g., fingers, thumb, knuckles, joint positions, etc.) within the image frame region identified by cropped image data or cropped image frame region 606. The hand landmark positions can be detected using the bounding box in some examples. The hand landmark positions can be detected based on the position of the palm or hand in the image frame region and/or an orientation of the respective bounding box. In some examples, the hand landmark positions (e.g., joints within fingers, between the palm and fingers, etc.) can be determined based on the location of the palm and the orientation of the palm in the image frame. For example, the position of hand landmarks can be based on the position and orientation of the palm or hand in the image.

In some examples, the key-point localization component 608 can detect landmarks based at least in part on hand geometry associated with a depicted hand. For instance, the model can identify a position of a center of a wrist attached to the palm in an image frame and one or more extracted features indicative of hand geometry within the image frame. In some examples, one or more features indicative of hand geometry of a palm or hand detected in an image frame can be extracted. For instance, the hand landmark model 111 can detect hand landmark positions by identifying features extending from a wrist feature towards one or more finger features. The feature extension can be identified in a direction from the center of a wrist connected to the palm in the image frame.

The key-point localization component 608 can perform key-point localization to generate three-dimensional coordinates 113 corresponding to a plurality of hand landmark positions. For example, the machine-learned hand landmark model 111 can detect a plurality of hand landmark positions within an image frame region, and generate three-dimensional coordinates corresponding to the hand landmark positions. In some examples, key-point localization component 608 can map the plurality of hand landmark positions within the image frame region to coordinates within the corresponding image frame. In this manner, the hand landmark model can detect hand landmark positions in a cropped and/or oriented image frame region and map the positions to a corresponding input image frame, generating the three-dimensional coordinates. As another example, the key-point localization component 608 can detect a plurality of hand landmark positions within an image frame and map the plurality of hand landmark positions as three-dimensional coordinates within the image frame. In some examples, the machine-learned hand landmark model can use a learned consistent internal hand pose representation to perform key-point localization.

The hand landmark model can additionally include a hand presence inference component 610 that is configured to determine whether a hand is depicted in an image frame. Component 610 can generate an output including a confidence value 612 indicative of the probability that a hand is depicted in an image frame. Hand tracking system 100 can selectively invoke the palm detection model 107 based on the confidence value 612 associated with hand presence in the image frame. If the confidence value 612 satisfies a pre-defined threshold, the hand landmark model 111 can generate and/or provide data indicative of three-dimensional coordinates corresponding to hand landmark positions within the image frame. If the confidence value 612 does not satisfy a pre-defined threshold, the hand landmark model 111 can input the corresponding image frame into the palm detection model 107.

Figure 7:
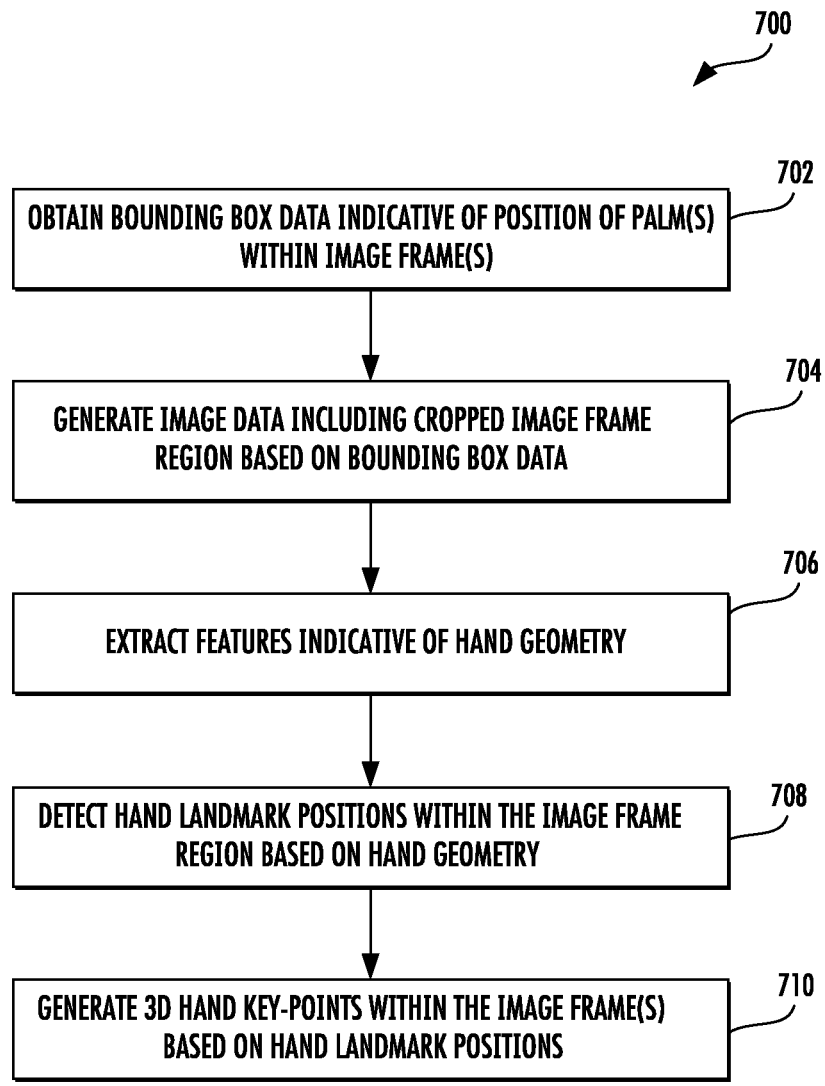
FIG. 7 depicts a flowchart illustrating an example method of generating three-dimensional hand key-points using a machine-learned hand landmark model according to example embodiments of the present disclosure.

FIG. 7 depicts a flowchart illustrating an example method 700 of generating three-dimensional hand coordinates or key-points according to example embodiments of the present disclosure. In some implementations, one or more operations of method 700 can be performed by a hand landmark model (e.g., hand landmark model 111). At 702, bounding box data can be obtained indicative of the position of one or more palms in an image frame as detected by the palm detection model. In some examples, the bounding box data can be indicative of the position of one or more hands in the image frame.

At (704), method 700 can include generating image data for an image frame region by cropping a corresponding image frame based at least in part on the respective oriented bounding box generated by the palm detection model. For example, the hand landmark model 111 can orient and/or crop an image frame based on the respective oriented bounding box to accurately display (or focus) the palm or hand in the image frame. In other examples, an image cropping unit separate from the hand landmark model can be used. Method 700 can include rotating, scaling, cropping, and/or orienting the image frame or the one or more palms in the image frame.

At (706), method 700 can include extracting features indicative of hand geometry within the image frame or within the cropped image frame region 606. Hand geometry can include biometrics and other features that can identify the shape of a hand. Hand geometry can include features of a hand along various dimensions (e.g., length between knuckles, width of fingers, width of knuckles, width of the palm, length of the palm, length of fingers, etc.).

At (708), method 700 can include detecting hand landmark positions (e.g., fingers, thumbs, knuckles, joint positions, etc.) within the image frame region based on hand geometry. For instance, the hand landmark model 111 can identify a position of a center of a wrist attached to the palm in an image frame and one or more extracted features indicative of hand geometry within the image frame. In some examples, the hand landmark model 111 can detect hand landmark positions by identifying features extending from a wrist feature towards one or more finger features. The feature extension can be identified in a direction from the center of a wrist connected to the palm in the image frame. In some examples, hand landmark positions can be identified using one or more hand geometry features, such as for example, by detecting a thumb in an image frame and using the detected thumb to detect a plurality of hand landmarks within the image frame.

Figure 8:
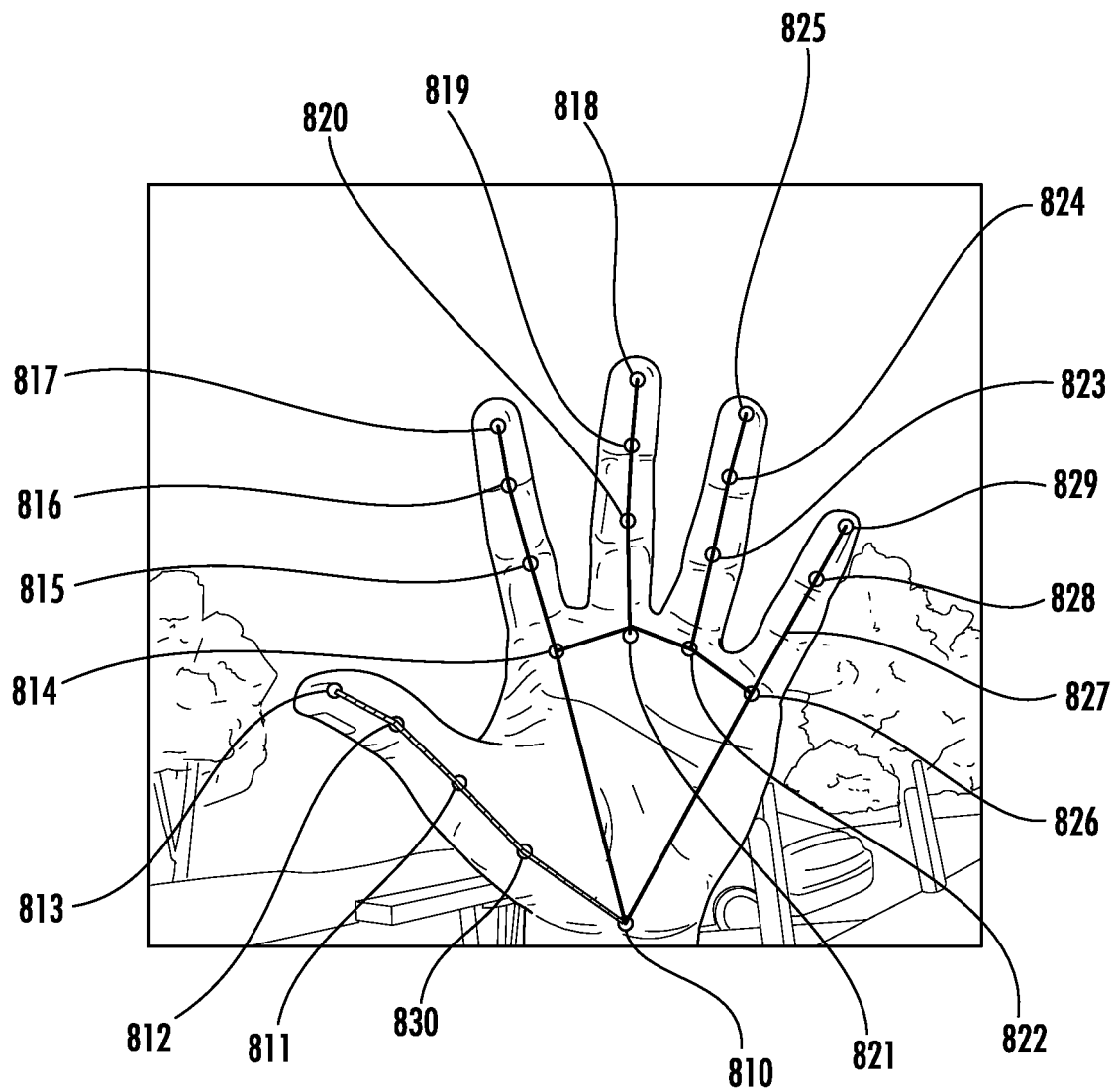
FIG. 8 depicts an example of landmark detections within an image frame using a machine-learned hand landmark model according to the embodiments of the present disclosure.

FIG. 8 depicts an example of landmark detections within an image frame illustrating the application of a machine-learned hand landmark model according to example embodiments of the present disclosure. In this example, a plurality of hand landmark positions 810-831 within a hand depicted in an image frame are depicted. In some examples, 21 hand landmark positions can be detected. However, more or fewer hand landmark positions can be detected by the hand landmark model. In this example, position 810 indicates the position of a hand landmark (e.g., a center of a wrist for palm or hand detected in the image frame). Position 820 indicates the position of a metacarpophalangeal joint of a middle finger of the hand detected in the image frame. Positions 813, 817, 818, 825, and 829 indicate the positions of the tips of the thumb, first finger, middle finger, ring finger, and little finger respectively in the image frame. Positions 814, 820, 823, and 827 indicate the positions of metacarpophalangeal joints of each of the fingers in the detected hand in the image frame.

Figure 9:
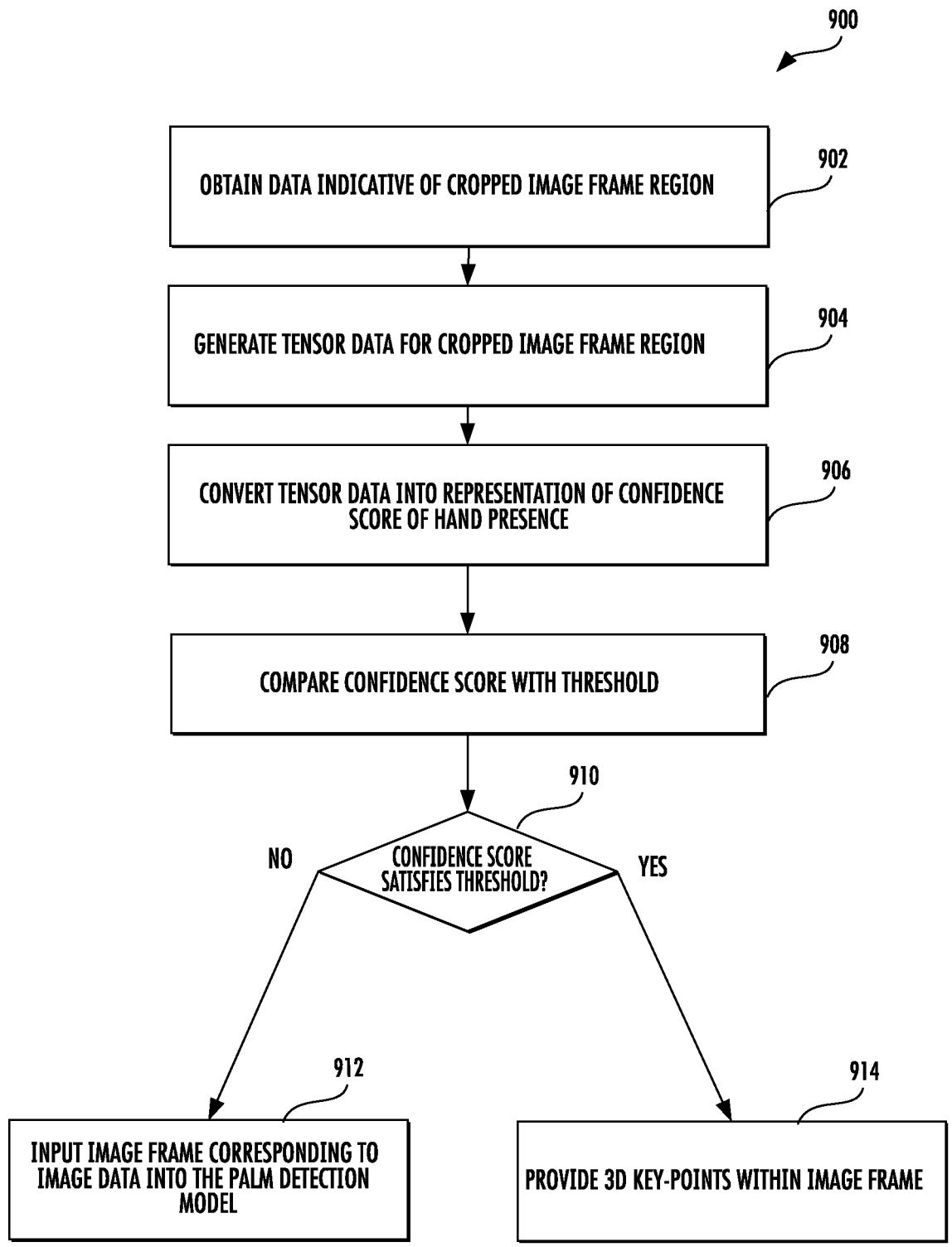
FIG. 9 depicts a flowchart illustrating an example method of generating a confidence value indicative of the presence of a hand within an image frame using a machine-learned hand landmark model according to example embodiments of the present disclosure.

FIG. 9 depicts a flowchart illustrating an example method 900 of generating a confidence value indicative of the presence of a hand within an image frame according to example embodiments of the present disclosure. Method 900 can be performed by or using a machine-learned hand landmark model. At (902), method 900 can include generating image data for an image frame region by cropping a corresponding image frame based at least in part on the respective oriented bounding box generated by the palm detection model.

At (904), method 900 can include generating tensor data for the cropped image frame region. For example, the hand landmark model can use a converter to convert an image frame into an image tensor. An inference component can be used to convert an image tensor into an output tensor vector that represents detection boxes, key-points, or a confidence score or confidence value indicative of the probability that a hand is present in the image frame.

At (906), the output tensor vector generated by the inference component can be converted into a number indicative of the confidence score. For example, the output vector tensor generated by the inference component can be split into data representative of the detection boxes, key-points, and confidence score to determine whether a hand is present in the image frame, the output vector tensor. In some examples, the representation of the confidence score can be a float value or any numerical value indicative of probability.

At (908), the confidence score representation is compared to a pre-determined threshold value to determine whether a hand is present in the image frame. For example, in some embodiments, the threshold value can be 0.7. In some examples, the pre-defined threshold value can be determined by the user. Alternatively or additionally, the pre-defined threshold value can be determined using a machine-learned model.

At (910), the hand landmark model can determine whether the confidence score or confidence value indicating the probability that a hand is present in the image frame satisfies a pre-defined threshold. At (914), if the confidence value satisfies the pre-defined threshold, the hand landmark model can generate and/or provide data indicative of three-dimensional coordinates corresponding to hand landmark positions within the image frame.

At (912), If the confidence value does not satisfy the pre-defined threshold, the hand landmark model can input the corresponding image frame into the palm detection model.

Figure 10:
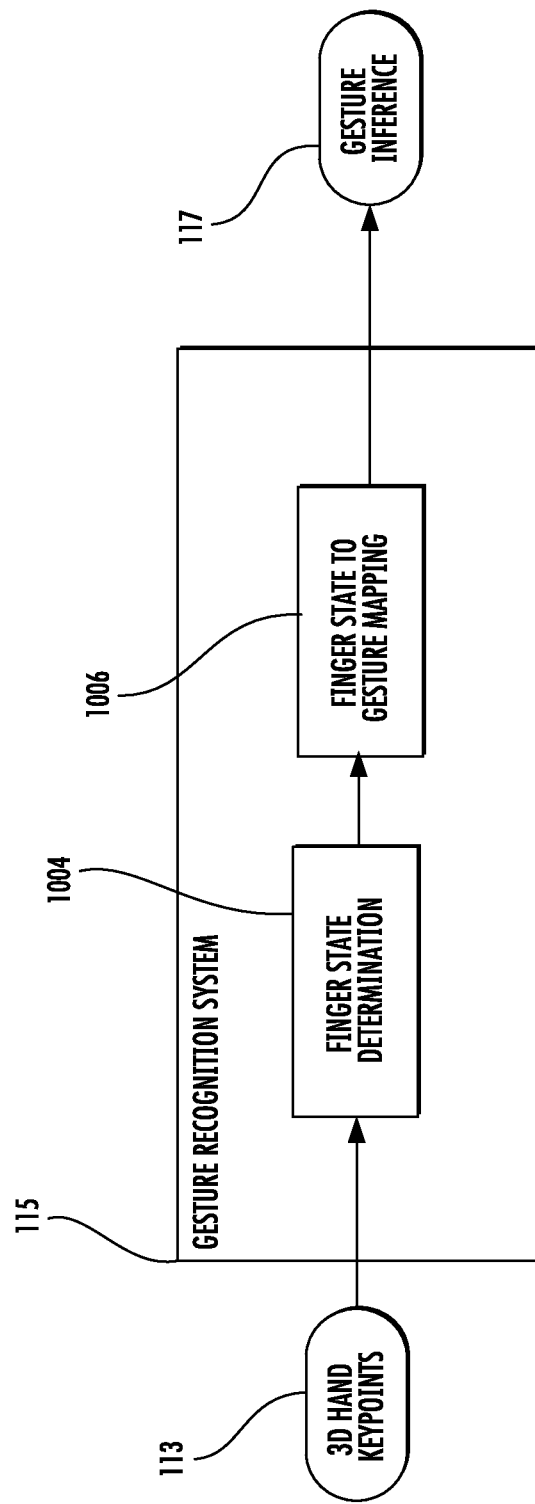
FIG. 10 depicts a block diagram of an example gesture recognition system according to example embodiments of the present disclosure.

FIG. 10 depicts a block diagram of an example gesture recognition system according to example embodiments of the present disclosure. Gesture recognition system 115 can identify a gesture in an image frame based at least in part on three-dimensional coordinates generated by the hand landmark model 111 for a plurality of hand landmark positions.

The gesture recognition system 115 can determine whether an image frame depicts one or more gestures based at least in part on the three-dimensional coordinates 113. The gesture recognition system can access data indicative of a hand skeleton in some embodiments. The hand skeleton can be defined using the three-dimensional coordinates corresponding to a plurality of hand landmark positions within an image frame. For example, the hand landmark model can define a hand skeleton by defining lines or edges that connecting the three-dimensional coordinates corresponding to a plurality of hand landmark positions in the image frame such that the connected hand landmark positions define a hand skeleton. In some examples, the hand skeleton can be defined as the set of three-dimensional coordinates. The hand skeleton can be generated by the gesture recognition system in some embodiments.

The gesture recognition system 115 can determine a set of finger states associated with each finger of the hand skeleton. In some examples, a finger state component 1004 can be used to determine a finger state associated with each finger in the rendered hand skeleton. For example, the set of finger states indicative of whether a finger is bent, straight, or oriented, etc. associated with each finger of the hand skeleton can be determined. In some examples, the finger states can be generated based at least in part on the accumulated angle of joints associated with each finger of the hand skeleton. The accumulated angle of joints can be determined based at least in part on the three-dimensional coordinates corresponding to the plurality of hand landmark positions such as joints, knuckles, fingers, and/or thumbs.

The gesture recognition system 115 can generate a gesture inference 117 identifying a gesture detected in an image frame by mapping a determined set of finger states to one or more pre-defined gestures. For example, the gesture recognition system 115 can map the finger states to one or more pre-defined gestures to identify a gesture in an image frame using a finger state to gesture mapping component 1006. In some examples, gesture recognition system 115 may include a mapping system including a data store of mappings between finger states and pre-defined gestures.

The gesture recognition system can generate data indicative of a hand skeleton using, in some examples, a hand skeleton component. In other examples, the hand landmark model may include a hand skeleton component. The hand skeleton component can define a hand skeleton using three-dimensional coordinates corresponding to a plurality of hand landmark positions within an image frame. For example, the gesture recognition system can define a hand skeleton by defining lines or edges that connect the three-dimensional coordinates corresponding to a plurality of hand landmark positions in the image frame such that the connected hand landmark positions define a hand skeleton. In some examples, the hand skeleton can be defined as the set of three-dimensional coordinates.

Figure 11:
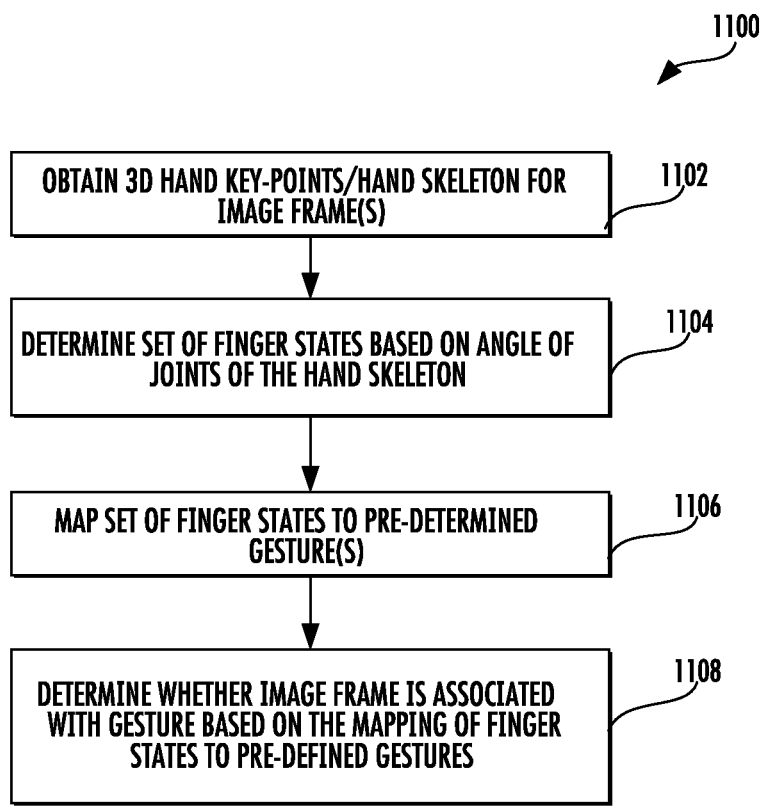
FIG. 11 depicts a flowchart illustrating an example method of identifying gesture(s) in an image frame using a gesture recognition system according to example embodiments of the present disclosure.

FIG. 11 depicts a flowchart illustrating an example method of identifying gesture(s) in an image frame according to example embodiments of the present disclosure. In some examples, method 1100 can be performed by a gesture recognition system (e.g., the gesture recognition system 115). At 1102, method 1100 includes obtaining three-dimensional coordinates or 3D hand key-points 113 corresponding to a plurality of hand landmarks within an image frame. For example, the gesture recognition system can obtain sets of three-dimensional coordinates generated by the machine-learned hand landmark model and can map the three-dimensional coordinates to determine whether one or more pre-defined gestures are present in an image frame. In some embodiments, the gesture recognition system 115 can obtain data indicative of a hand skeleton. For example, the hand landmark model and/or gesture recognition system can define a hand skeleton using edges or lines that connect the three-dimensional coordinates for hand landmark positions in the image frame such that the connected hand landmark positions define a hand skeleton. In some examples, the hand skeleton can be defined as the set of three-dimensional coordinates. In some embodiments, a tracking system does not necessarily generate a hand skeleton and determines a set of finger states using the three-dimensional hand coordinates corresponding to the hand landmark positions in the image frame.

At 1104, method 1100 can include determining a set of finger states based on the angle of the joints in the hand skeleton. For example, a set of finger states (e.g., bent, straight, oriented, etc.) associated with each finger of the hand skeleton can be determined. The finger states can be determined based at least in part on the accumulated angle of joints associated with each finger of the hand skeleton. The accumulated angle of joints can be determined based at least in part on the three-dimensional coordinates corresponding to the plurality of hand landmark positions such as joints, knuckles, fingers, and/or thumbs.

At (1108), method 1100 can include mapping the set of finger states to one or more pre-defined gestures. For example, the gesture recognition system 115 can associate a gesture detected in an image frame with one or more pre-defined gestures based at least in part on mapping the determined set of finger states to a set of pre-defined gestures. In some examples, the gesture recognition system 115 may include a mapping system including a data store of mappings between finger states and pre-defined gestures. Additionally or alternatively, the gesture recognition system may include one or more machine-learned classifiers that are trained to identify pre-defined gestures based at least in part on three-dimensional hand coordinates generated by the hand landmark model.

Figure 12:
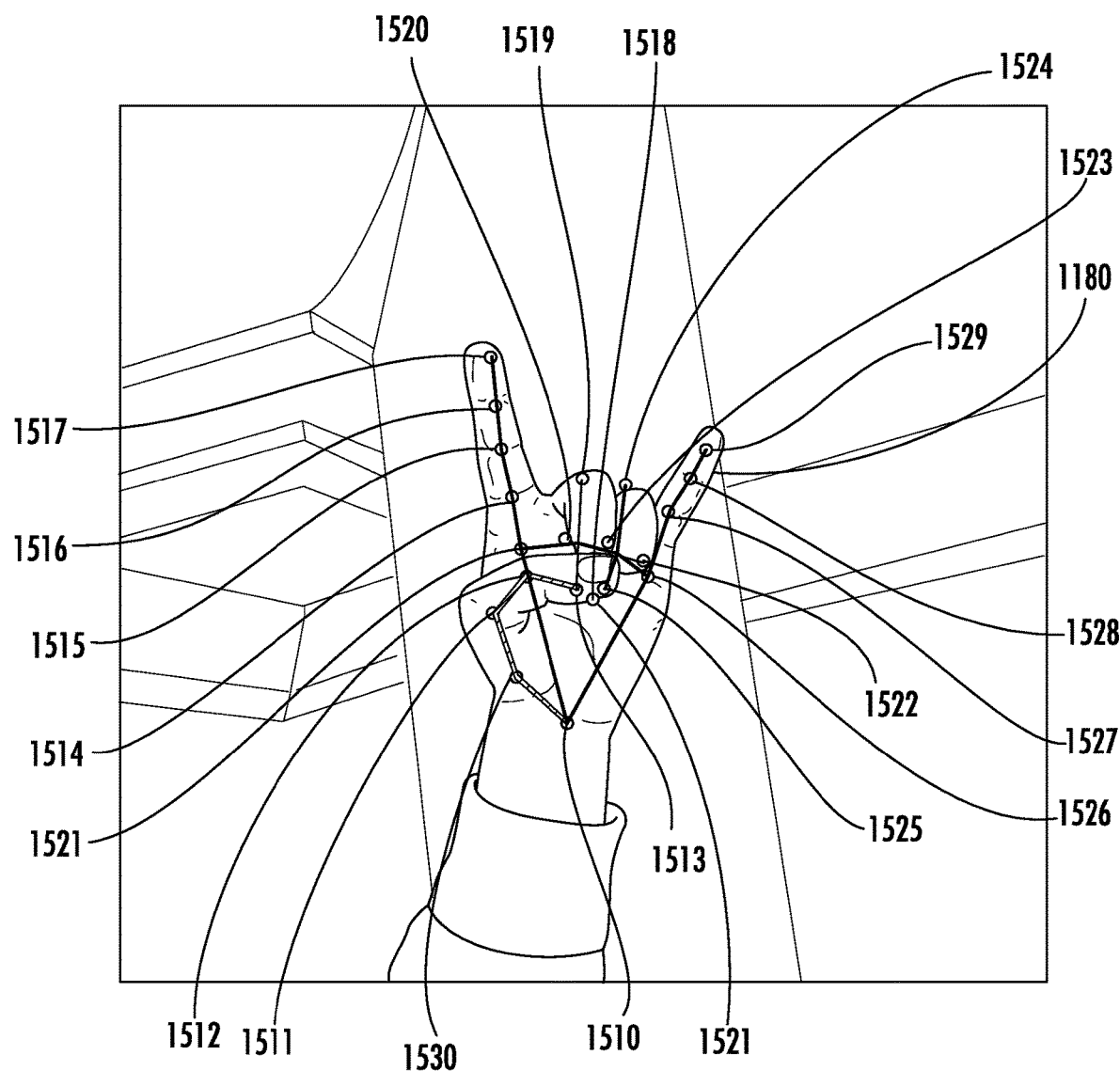
FIG. 12 depicts example detections within an image frame using a gesture recognition system according to example embodiments of the present disclosure.

FIG. 12 depicts an example of a rendered image frame including a graphical illustration of a set of hand landmark positions 1510-1531 as can be determined by a hand landmark model in accordance with example embodiments of the present disclosure. The rendered image frame additionally includes a graphical depiction of a predicted hand skeleton 1180 as can be determined by the hand landmark model for an input image frame. In some embodiments, a gesture recognition system may identify a particular gesture based on the depiction of the hand in the image frame.

Figure 13:
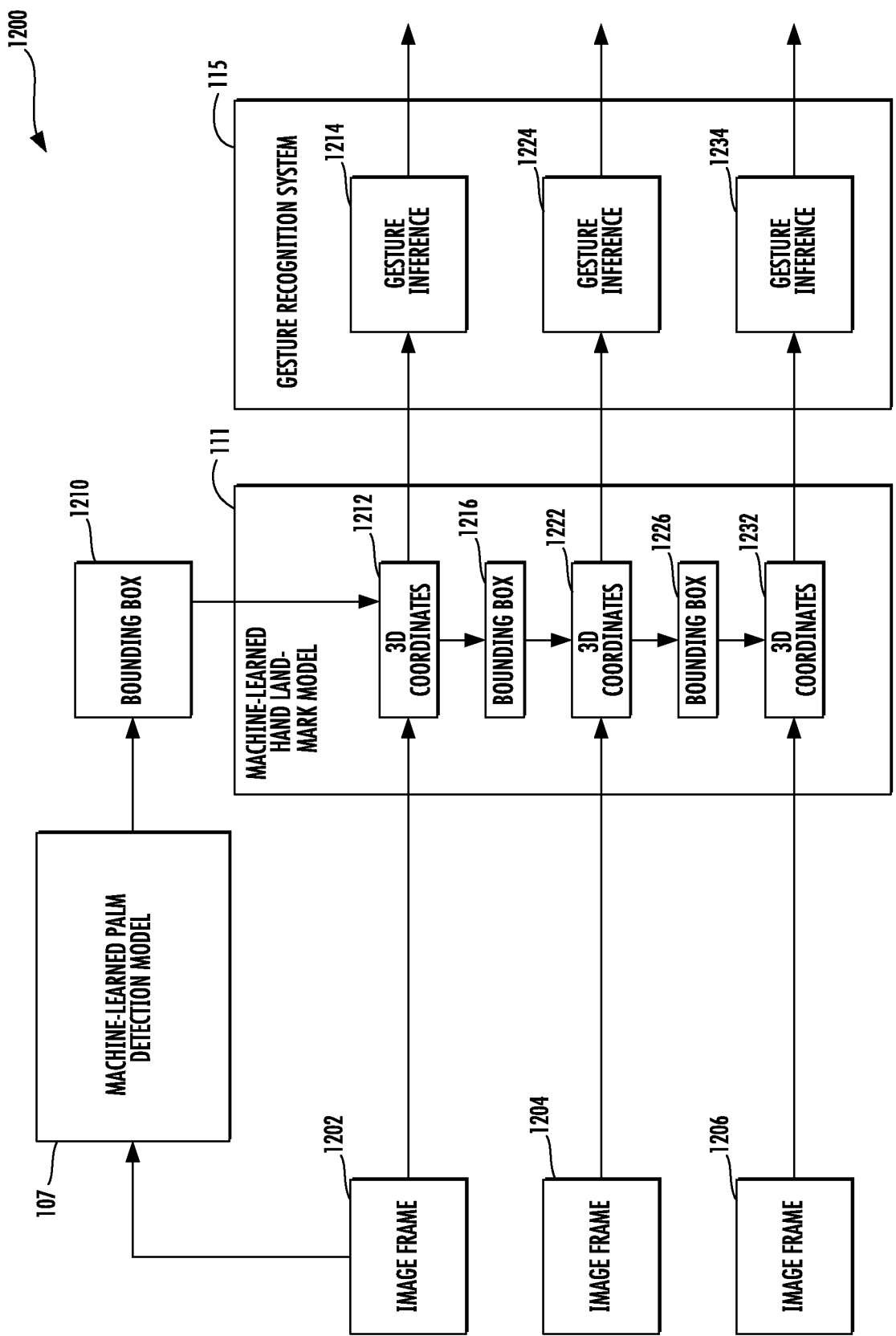
FIG. 13 depicts a block diagram of an example hand tracking system including a machine-learned palm detection model, a machine-learned hand landmark model, and a gesture recognition system according to example embodiments of the present disclosure.

FIG. 13 depicts a block diagram of an example hand tracking system 1200 including a machine-learned palm detection model 107, a machine-learned hand landmark model 111, and a gesture recognition system 115 according to example embodiments of the present disclosure. In some examples, the hand tracking system can apply the palm detection model selectively to image frames input to the tracking system and can persistently apply the hand landmark model to each image frame. In other implementations, the hand landmark model may be applied to less than all of the image frames. In FIG. 13, a first image frame 1202 in a sequence of image frames can be input into the palm detection model 107. Palm detection model 107 can detect or otherwise determine whether one or more palms are depicted in image frame 1202. If a palm is detected in the image frame, palm detection model 107 can generate a bounding box 1210 indicative of the position of the detected palm. In some examples, bounding box 1210 can indicate a position of a hand for a detected palm. The bounding box can be generated by expanding a detected position of the palm using one or more expansion parameters. Bounding box 1210 can be input into the hand landmark model 111 to generate three-dimensional coordinates 1212 corresponding to a plurality of hand landmarks in image frame 1202. The three-dimensional coordinates 1212 for the hand depicted in image frame 1202 can be provided to gesture recognition system 115. Gesture recognition system 115 can identify a gesture depicted in the first image frame 1202. In some examples, hand landmark model 111 can also generate a bounding box 1216 indicative of the likely position of the palm or hand in the subsequent image frame 1204. For example, the hand landmark model 111 can generate a bounding box 1216 indicative of the position of a palm or hand in image frames 1204 based on the bounding box 1210 and/or three-dimensional coordinates 1212 generated for the first image frame 1202. Bounding box 1216 can be used by the hand landmark model 111 to determine three-dimensional coordinates for the subsequent image frame 1204. Similarly, hand landmark model 111 can generate three-dimensional coordinates 1222 corresponding to a plurality of hand landmarks in image frame 1204. The 3D coordinates 1222 for the hand depicted in image frame 1204 can be provided to gesture recognition system 115 to determine whether a gesture is depicted in image frame 1204. Hand landmark model 111 can generate a bounding box 1226 indicative of the position of a palm or hand in image frame 1204 based on the bounding box 1216 and/or three-dimensional coordinates 1222 generated for the second image frame 1204. Bounding box 1226 can be used by hand landmark model 111 to determine three-dimensional coordinates 1232 for the subsequent image frame 1206. This technique can enable the palm detection model to be applied on selective image frames. In some examples, the hand tracking system can perform hand detection using the machine-learned hand landmark model. If a hand is detected by the hand landmark model, the system can perform keypoint localization without invoking the palm detector model to identify a palm in the image frame. If a hand is not detected by the hand landmark model, the tracking system can provide the image frame to the palm detection model for palm detection.

Figure 14:
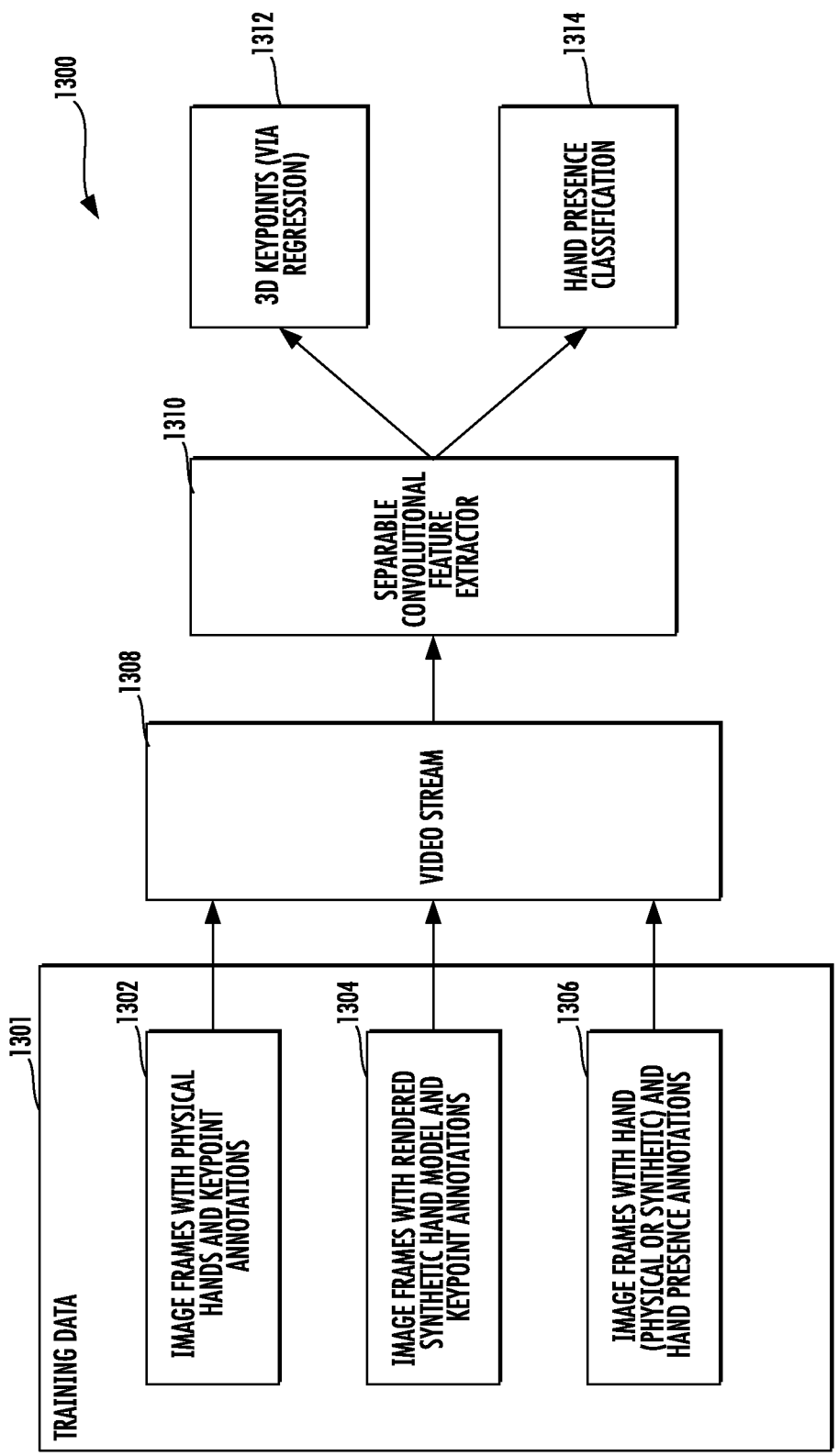
FIG. 14 depicts a block diagram of an example training schema used to train a machine-learned hand tracking system according to example embodiments of the present disclosure.

FIG. 14 depicts a block diagram of an example training schema used to train a machine-learned hand tracking system according to example embodiments of the present disclosure. The training data 1301 used to train the hand tracking system can include a first set of image frames 1302 that depict one or more physical hands. The first set of image frames can be annotated with ground truth data that indicates hand landmark positions for the physical hand(s) depicted in the first set of images. The annotations can include three-dimensional coordinates in example embodiments. The coordinates can include a depth value taken from a depth map in some examples. The training data can include a second set of image frames 1304 annotated with ground truth data that indicates hand landmark positions for one or more rendered synthetic hand models that are depicted within the second set of annotated images frames. The second set of image frames can provide additional coverage for possible hand poses and provide additional supervision on the nature of hand geometry. The second set of image frames can include the synthetic hand model rendered over various backgrounds. The annotations can include a mapping of the rendered synthetic hand model to corresponding three-dimensional coordinates. By using a mixed training schema, a model can be trained that generalizes well in the real-world domain due to the physical real-world training examples, and that includes a range of hand poses as provided by the synthetic hand model examples. In some examples, the training data can include an optional third set of image frames 1306 annotated with ground truth data that indicates whether a hand is present in the third set of image frames. The third set of image frames 1306 can be used to train the machine-learned hand tracking system to detect hand presence. In some examples, the first or second set of image frames can additionally or alternatively be annotated with ground truth data that indicates whether a hand is present in the first or second set of image frames.

Figure 15:
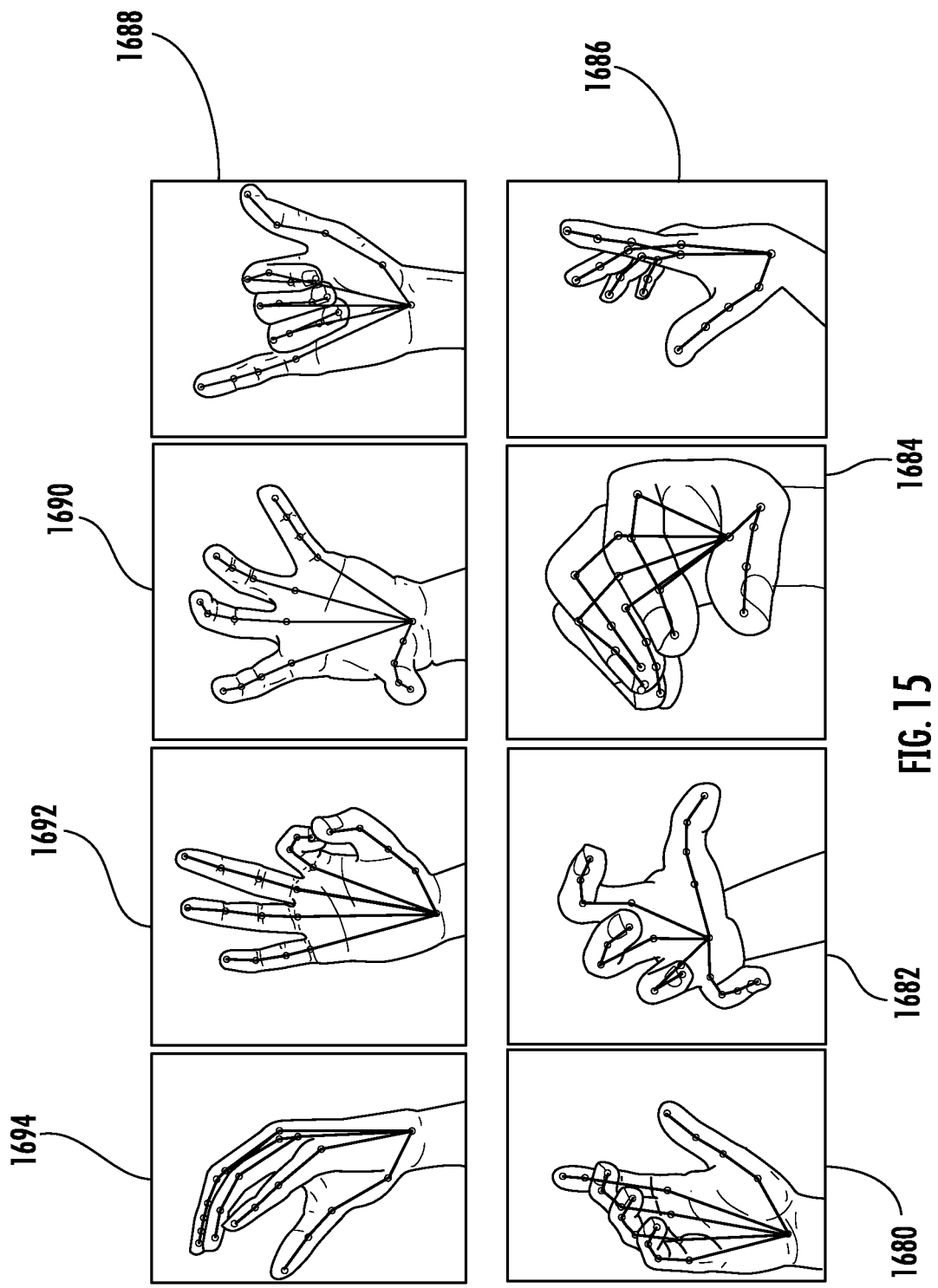
FIG. 15 depicts a flowchart illustrating an example method of training a hand tracking system according to example embodiments of the present disclosure.

FIG. 15 depicts example training image frames annotated with ground truth data that indicates the hand landmarks for the hands depicted in the respective image frames. Image frames 1688-1694 are image frames annotated with ground truth data that indicates hand landmark positions for one or more physical hands depicted within the set of annotated image frames. Image frames 1680-1686 are image frames annotated with ground truth data that indicates hand landmark positions for one or more rendered synthetic hand models that are depicted within the set of annotated images frames.

In some examples, the training data can be provided as one or more video streams 1308 of other groupings of data to a separable convolutional feature extractor 1310. Feature extractor 1310 can extract features from the training data. For example, the feature extractor can extract from an image frame features associated with hand landmarks. Based on the features extracted from an image frame, the hand landmark model can determine a set of three-dimensional coordinates 1312 for the hand landmarks. The hand landmark model can use a regression technique in some examples to generate a set of three-dimensional coordinates. Additionally, the hand landmark model can generate a classification indicating whether a hand is depicted within the image frame.

The predicted three-dimensional coordinates for an image frame can be compared with the annotations in the training data to determine one or more errors associated with the prediction. In some examples, a loss function can be determined based on a comparison of the predicted coordinates with the annotated coordinates. The loss function can be backpropagated to the machine-learned palm detection model and/or the machine-learned hand landmark model to train the machine-learned system. By way of example, the loss function can be backpropagated through the hand landmark model to modify one or more portions of the hand landmark model. For instance, one or more weights or other parameters associated with the model can be modified based on the loss function.

Figure 16:
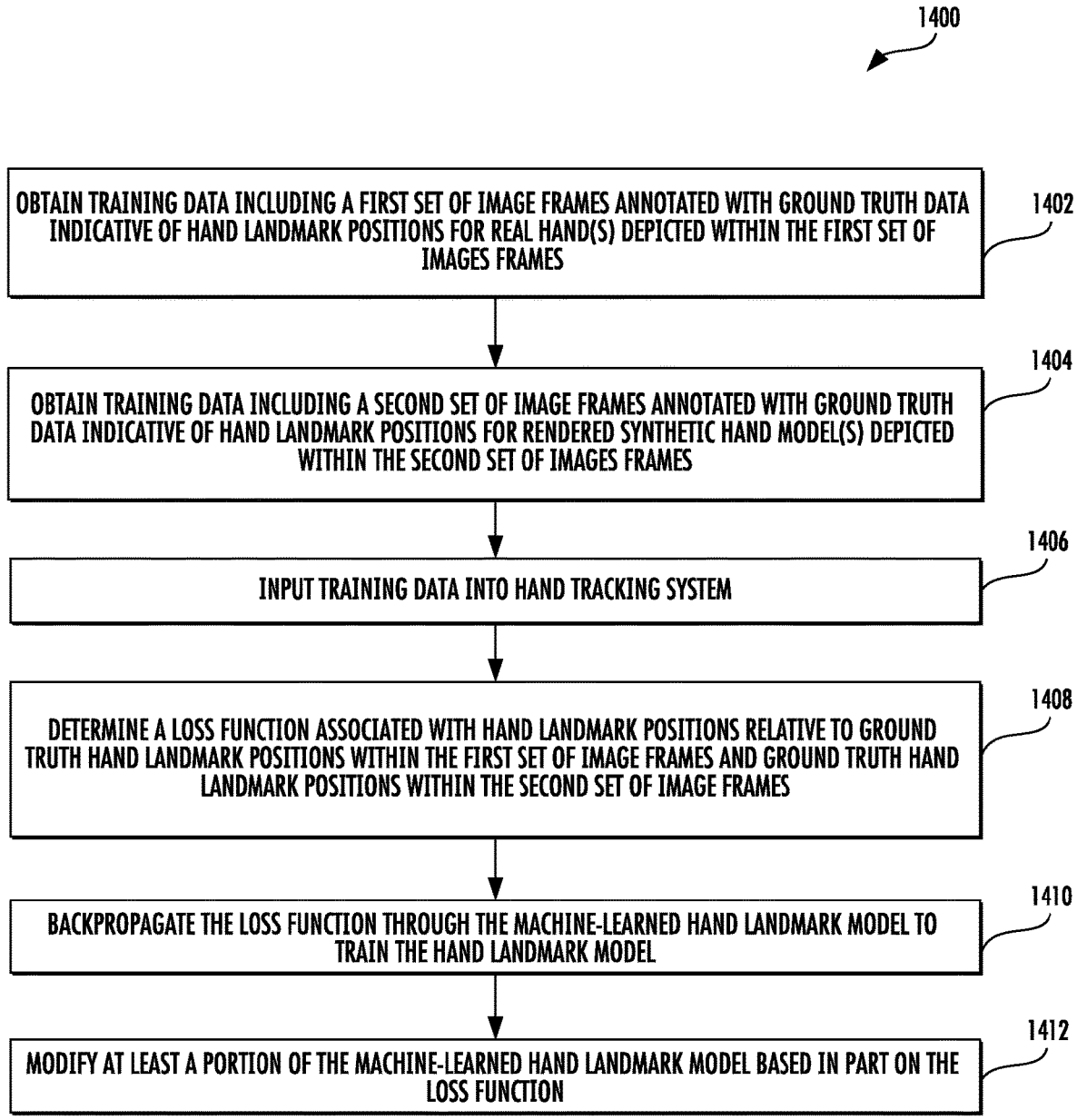
FIG. 16 depicts example training data annotated with ground truth data that indicates hand landmark positions.

FIG. 16 depicts a flowchart illustrating an example method 1400 of training a hand tracking system according to the embodiments of the present disclosure. For example, a hand tracking system in accordance with example embodiments can be trained to determine three-dimensional coordinates corresponding to a plurality of hand landmark positions within an image frame and/or to detect whether a hand is present in the image frame. Method 1400 can be performed by a computing system such as a training computing system 2150 of FIG. 21A in example embodiments.

At (1402), method 1400 can include obtaining training data including a first set of image frames annotated with ground truth data that indicates hand landmark positions for one or more physical hands depicted within the first set of images. In some examples, training data including the first set of image frames can be annotated with ground truth data that indicates three-dimensional coordinates corresponding to a plurality of hand landmark positions. The three-dimensional coordinates can include a z-value (or depth value) taken from an image depth map for the first set of image frames.

At (1404), method 1400 can include obtaining training data including a second set of image frames annotated with ground truth data that indicates hand landmark positions for one or more rendered synthetic hand models that are depicted within the second set of annotated images frames. For example, a hand model can be rendered in a variety of poses and mapped to a plurality of hand landmark positions. In some examples, training data including synthetic hand models can be annotated with ground truth data that indicates three-dimensional coordinates corresponding to a plurality of hand landmark positions. The three-dimensional coordinates can include a z-value (or depth value) taken from an image depth map for the second set of image frames or can be generated using a computer-generated hand model.

At (1406), method 1400 can include inputting the training data including a first set of image frames and a second set of image frames into the hand tracking system. In some embodiments, the training data can be input to hand landmark model 111. Additionally or alternatively, the training data can be input to palm detection model 107.

At (1408), method 1400 can include determining a loss function based on errors between hand landmark positions detected by the machine-learned hand landmark model and ground truth data that indicates hand landmark positions for physical hands depicted within the first set of images frames. Additionally or alternatively, the loss function can be determined based on errors between the detected landmark positions and ground truth data that indicates hand landmark positions for a rendered synthetic hand model depicted within the second set of images frames.

At (1410), method 1400 can include the training system can backpropagate the loss function to the machine-learned hand tracking system to train the palm detection model and/or the hand landmark model.

At (1412), method 1400 can include modifying at least a portion of the palm detection model and/or the machine-learned hand landmark model based at least in part on the loss function. For example, the training system can modify one or more of the weights associated with the machine-learned palm detection or machine-learned hand landmark model.

Figure 17:
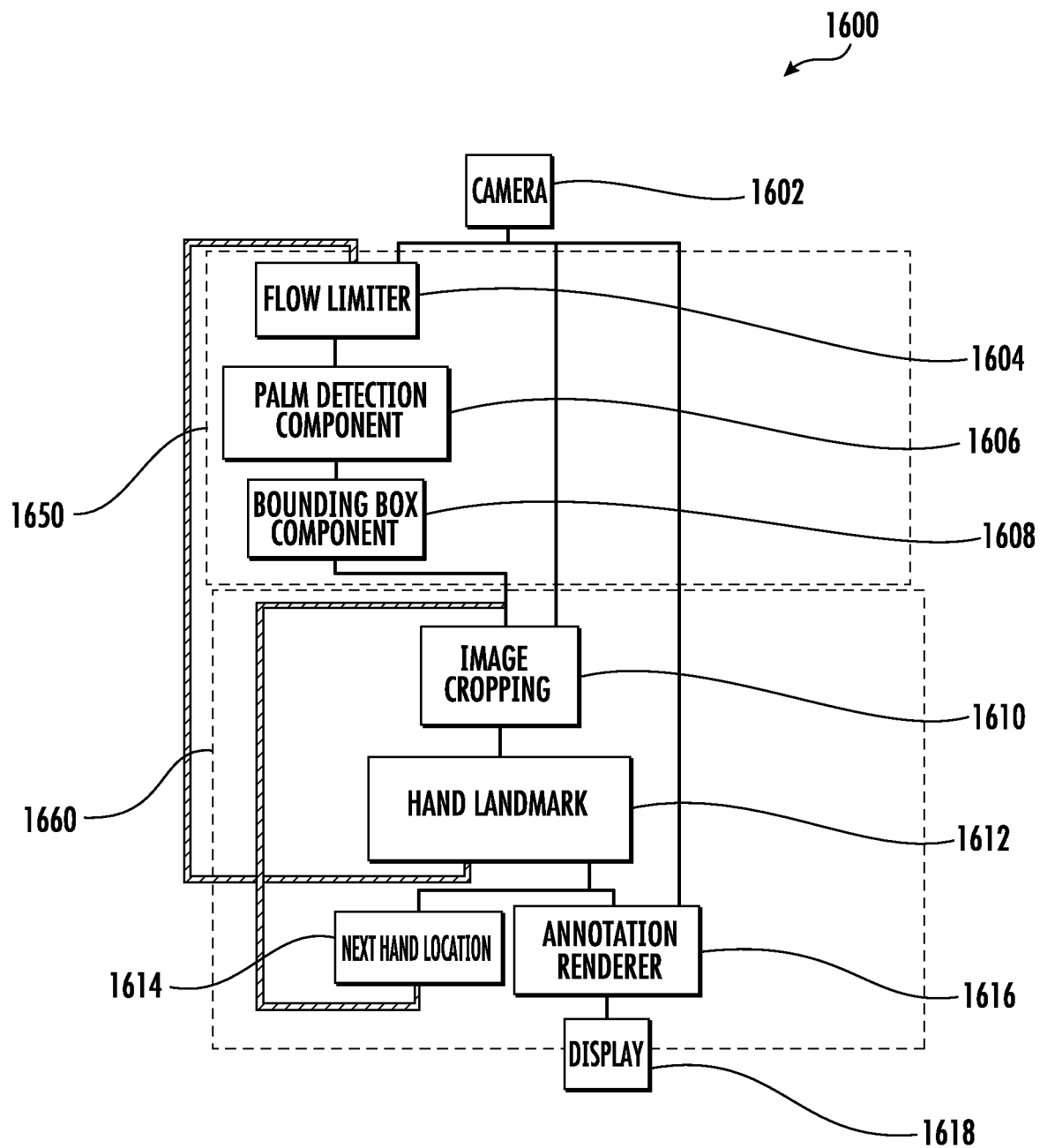
FIG. 17 depicts a block diagram of an example hand tracking system according to example embodiments of the present disclosure.

FIG. 17 depicts a block diagram of an example hand tracking system according to the embodiments of the present disclosure. FIG. 17 depicts one example implementation in which the hand tracking system includes a directed graph of modular components (e.g., calculators). In this example, the hand tracking system can be built as or otherwise include a graph hand tracking system including subgraphs for palm detection and hand landmark detection. A first subgraph 1650 can implement a palm detection model and a second subgraph 1660 can implement a hand detection model. It will be appreciated that the graph depicted in FIG. 17 is but one of many possible implementations of a hand tracking system in accordance with embodiments of the present disclosure. In this example, the hand tracking system can receive input image frames from an input video 1602 source (e.g., camera). However, the input image data can include image data from any image sensor such as a RADAR sensor or LIDAR sensor as earlier described.

The palm detection subgraph can include a flow limiter 1604 that throttles images flowing downstream through the hand tracking system. In some examples, the flow limiter passes the first input image unaltered through to the palm detection model 1606, and for subsequent images, waits for downstream models in the hand tracking system before passing another image frame. The throttling of image frames prevents downstream models from queuing incoming image frames, preventing latency and memory usage in real-time applications.

A palm detection model 1606 can be configured to detect one or more palms in an image frame. For example, the palm detection model can extract features associated with palms from image frames to detect and predict palm positions.

A bounding box component 1608 can generate an oriented bounding box indicating the position of a hand or palm within an image frame based on the detection from palm detection model 1606. In some examples, the bounding box component can expand a bounding box associated with a palm in order to identify a possible hand location. For instance, the palm detection model can estimate one or more first bounding boxes indicative of one or more detected palms in an image frame and expand and/or shift the one or more first bounding boxes to generate one or more second bounding boxes indicative of the location of an entire hand in the image frame.

The hand landmark model subgraph can include an image cropping component 1610 that is configured to can generate image data for an image frame region by cropping the corresponding image frame based at least in part on the respective orientated bounding box. The image cropping component can orient and/or crop an image frame based on the respective oriented bounding box to accurately display (or focus) the palm or hand in the image frame. In some examples, the image cropping component 1610 can be included in the palm detection model subgraph or outside either subgraph. The hand landmark model can be configured to obtain the image data for an image frame generated by the image cropping component 1610.

The hand landmark model subgraph can include a hand landmark component 1612 configured to detect a plurality of hand landmark positions (e.g., fingers, thumb, knuckles, joint positions, etc.) within the image frame region and generate three-dimensional coordinates corresponding to the hand landmark positions within the image frame region. For example, the hand landmark component 1612 can detect hand landmark positions based on the position of the palm or hand in the image frame and/or an orientation of the respective bounding box generated by the bounding box component 1608. In some examples, the hand landmark component 1612 can detect landmarks based at least in part on hand geometry of a depicted hand. In some examples, the hand landmark component 1612 can perform key-point localization to generate three-dimensional coordinates corresponding to the plurality of hand landmark positions. The hand landmark component 1612 can detect a plurality of hand landmark positions within an image frame and map the plurality of hand landmark positions as three-dimensional coordinates within the image frame.

The hand landmark subgraph can include a next hand location component 1614 that is configured to generate a rectangle that comprises the palm or hand in a subsequent image frame based in part on the hand landmark positions or the three-dimensional coordinates corresponding to the hand landmark positions in the current image frame. In some examples, the generated rectangle comprising the hand can be expanded and transformed such that the rectangle is likely to comprise the hand in the next image frame. This expanded rectangle can indicate the location of the hand in the image frame. The location of a hand in a subsequent video frame can be predicted based on the hand landmark positions or three-dimensional coordinates corresponding to the hand landmark positions within a current image frame or image frame region. In some examples, the next location component 1814 can orient and/or crop the subsequent image frame based on the predicted location of the hand in the subsequent image frame. In this manner, image data for the subsequent image frame can be generated that indicates the likely position of the hand based on the position of the hand in the current image frame. The image cropping component 1610 or the hand landmark component 1612 can proceed by detecting a plurality hand landmarks within the subsequent image frame and generate three-dimensional coordinates corresponding to the plurality of hand landmarks.

The hand landmark subgraph can include an annotation rendering component 1616 that is configured to render a hand skeleton for an image frame, based on the bounding box generated by the bounding box component 1608 and/or the hand landmark positions detected by the hand landmark component 1612. In some examples, the annotation rendering component 1616 can generate the hand skeleton for the respective image frame by overlaying the hand skeleton and bounding box on the respective input image frame.

Figure 18:
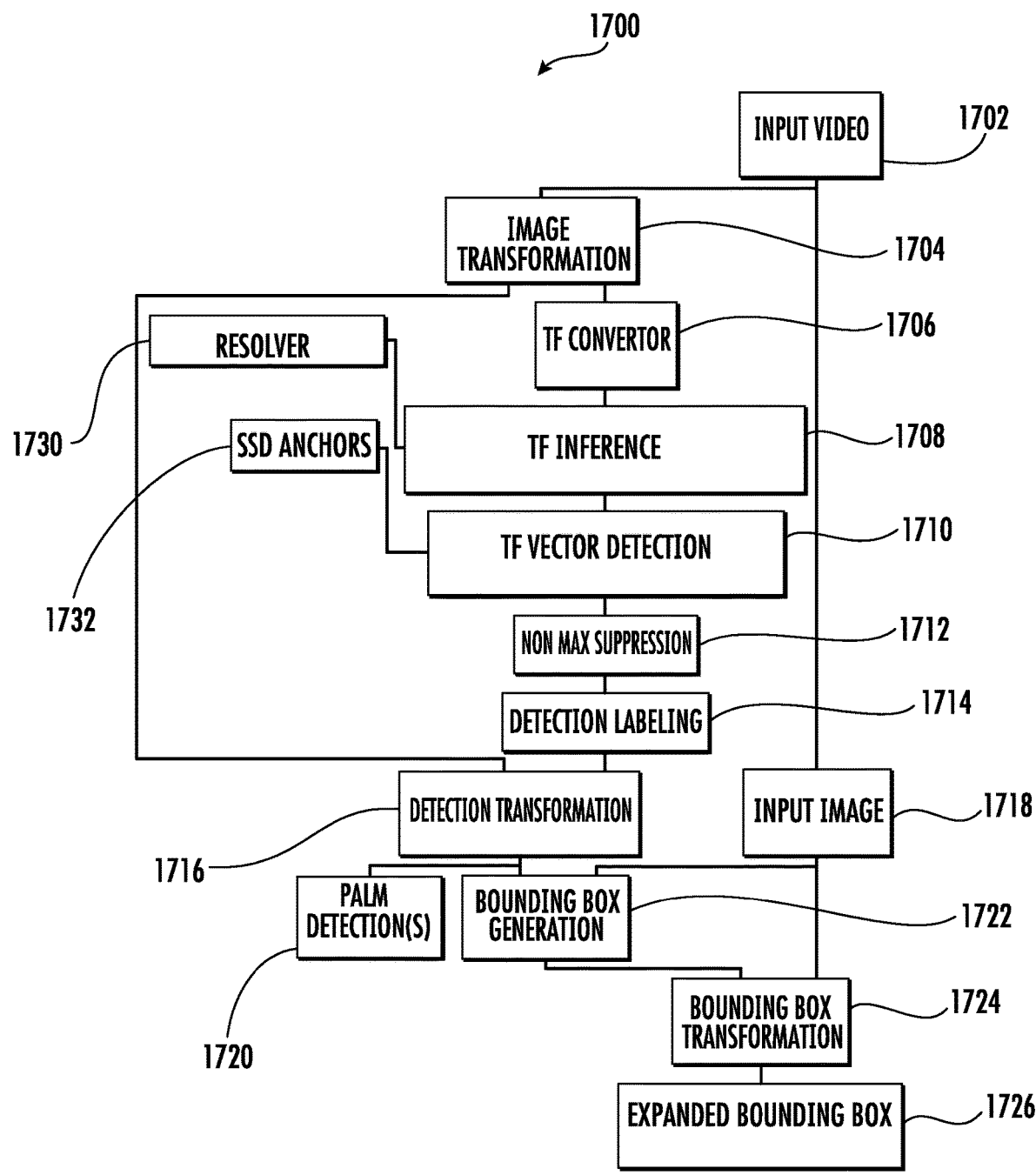
FIG. 18 depicts a block diagram of an example machine-learned palm detection model according to example embodiments of the present disclosure.

FIG. 18 depicts a block diagram of an example of a palm detection sub-graph in accordance with example embodiments of the present disclosure.

In this example, the palm detection subgraph of a hand tracking system can receive input image frames 1702 from an input source. The input image data can be any image data as referred to in FIG. 1. The palm detection model can transform an input image frame into an image of a pre-defined size (e.g., 800×800 pixels, 256×256, etc.). In some embodiments, the palm detection subgraph can transform an input image frame using an image transformation unit 1704 configured to transform an input image frame into an image of a pre-defined size.

The palm detection subgraph can include a resolver 1730 configured to resolve or otherwise support operations performed by the palm detection model and/or hand landmark model in the hand tracking system. The palm detection subgraph can include converter 1706 that is configured to convert a transformed image frame into one or more image tensors and to store the image tensor. An inference component 1708 can convert the image tensors into one or more outputs including a vector of tensors representing, for example, bounding boxes and/or key-point scores.

The palm detection subgraph can include a vector detection component 1710 that is configured to decode the vector tensors generated by the inference component 1708 into a vector of detections. Each detection within a vector of detections describes a detected object (e.g., bounding box, hand landmarks, 3D hand key-points, etc.).

One or more non-max suppression techniques can be applied to reject the excessive objects detected by the vector detection component 1710. For example, if multiple objects are detected such that multiple detections refer to the same object, some detections are combined and/or eliminated.

The objects detected by the vector detection component 1710 are labeled to indicate the object using a detection labeling component 1714. For example, if a palm is detected then the detection labeling component 1714 may label the detection "palm."

The palm detection subgraph can include a detection transformation component 1716 that is configured to adjust and/or transform the detected object(s) and/or their locations to correspond with the input image frame. After adjusting the locations of the detected palms or hands in the image frame, the palm detection subgraph estimates a bounding box 1720 that comprises the palm or hand detected. In some examples, the bounding box that encloses or comprises the detected hands or palms is oriented such that a line connecting the center of the wrist and metacarpophalangeal joint of the middle finger of the detected hand or palm is aligned to a y-axis of the bounding box 1720.

The palm detection subgraph can include a bounding box transformation component 1724 that is configured to generate a second bounding box that indicates the position of the hand in the image frame. In some examples, the bounding box transformation component 1724 is configured to expand and/or transform (e.g., rotate, scale, orient, etc.) the bounding box generated by bounding box generator 1722 to indicate the position of the entire hand. This expanded bounding box 1726 can indicate the location of the hand in the image frame based on the position of the palm in the image frame.

Figure 19:
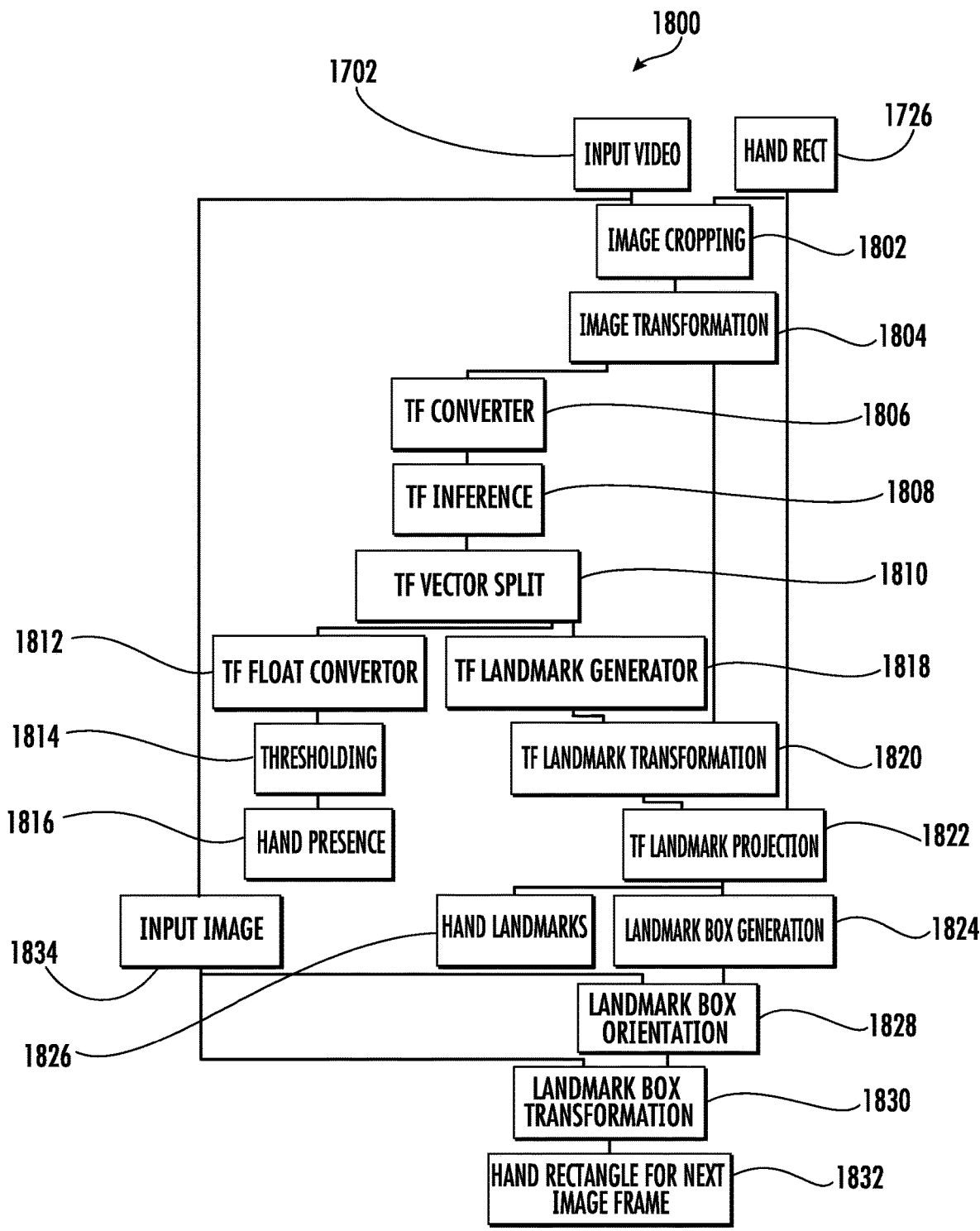
FIG. 19 depicts a block diagram of an example machine-learned hand landmark model according to example embodiments of the present disclosure.

FIG. 19 depicts a block diagram of an example hand landmark sub-graph according to example embodiments of the present disclosure.

In this example, the hand landmark subgraph of the hand tracking system can receive a bounding box 1726 indicative of the position of a palm or hand in the input image frame and the input image frame 1702 itself. In some embodiments, the hand landmark subgraph can include an image cropping component 1802 that is configured to generate image data for an image frame region by cropping the corresponding image frame based at least in part on the respective orientated bounding box. The image cropping component 1802 can orient and/or crop an image frame based on the respective oriented bounding box to accurately display (or focus) the palm or hand in the image frame. In some examples, the image cropping component 1802 can be included in the palm detection model subgraph or elsewhere. The hand landmark model can be configured to obtain the image data for an image frame generated by the image cropping component.

The hand landmark subgraph can include an image transformation component 1804 configured to transform the cropped image frame region generated by the image cropping component 1802. For example, the image transformation component can orient and/or crop an image frame region generated by the image cropping component 1802 based on the respective bounding box 1726 and to accurately display (or focus) the palm or hand in the image frame. In some examples, the image transformation component 1804 can rotate, scale, orient, or otherwise transform the image frame region based on the orientation of the bounding box corresponding to hands or palms.

The hand landmark subgraph can include a converter 1806 configured to resolve or otherwise support operations performed by the palm detection model and/or hand landmark model in the hand tracking system. The hand landmark subgraph can include converter 1806 that is configured to convert a transformed image frame region generated by the image transformation component 1804 into one or more image tensors and to store the image tensor.

The hand landmark subgraph can include an inference component 1808 can convert the image tensors into one or more outputs including a vector of tensors representing, for example, bounding boxes and/or key-point scores.

The hand landmark subgraph can include a vector split component 1810 configured to split the output vectors generated by the inference component 1808 into multiple vectors of tensors. For example, the output vector of tensors representing bounding boxes and/or key-point scores can be split into a first vector of tensors representing hand presence inference in an image frame and a second vector of tensors representing hand landmark positions.

The hand landmark subgraph can include a float converter 1812. The float converter 1812 can be configured to convert the first set of tensors representing hand presence inference in an image frame into a float that represents the confidence value that indicates a probability that a hand is present in the image frame.

The hand landmark subgraph can include a thresholding component 1814 configured to compare the confidence value generated by the float converter 1812 to a threshold value to determine whether a hand is present in the image frame. In some examples, if the confidence value satisfies a pre-defined threshold, the hand landmark model can generate and/or provide data indicative of three-dimensional coordinates corresponding to hand landmark positions within the image frame. If the confidence value does not satisfy a pre-defined threshold, the hand landmark model can input the corresponding image frame into the palm detection model.

The hand landmark subgraph can include a hand landmark generator 1818 that is configured to convert the second vector of tensors into a vector of hand landmark positions or three-dimensional coordinates corresponding to the hand landmark positions within an image frame.

The hand landmark subgraph can include a landmark transformation component 1820 configured to adjust the detected hand landmark positions to fit the input image frame. In some examples, the hand landmark positions or three-dimensional coordinates can be normalized with respect to the input image.

The hand landmark subgraph can include a landmark box generation component 1824 configured to map the hand landmark positions or three-dimensional coordinates from the cropped image frame region to the corresponding full image frame. In some examples, the hand landmark subgraph can include a landmark box generation component 1824 configured to generate a rectangle that comprises the palm or hand detected.

In some examples, the hand landmark subgraph can include a landmark orientation box 1828 configured to orient the hand rectangle generated by landmark box generation 1824. In some examples, the rectangle that encloses or comprises the detected hands or palms is oriented such that a line connecting the center of the wrist and metacarpophalangeal joint of the middle finger of the detected hand or palm is aligned to a y-axis of the rectangle.

The hand landmark subgraph can include a landmark box transformation component 1830 that is configured to expand the oriented rectangle generated by the landmark orientation box 1828. In some examples, the generated rectangle comprising the hand can be expanded and transformed such that the rectangle is likely to comprise the hand in the next image frame. This expanded rectangle can indicate the location of the hand in the image frame. The location of a hand in a subsequent image frame can be predicted based on the hand landmark positions or three-dimensional coordinates corresponding to the hand landmark positions within a current image frame or image frame region. In some examples, the landmark box transformation component 1830 can orient and/or crop the subsequent image frame based on the predicted location of the hand in the subsequent image frame. In this manner, image data for the subsequent image frame can be generated that indicates the likely position of the hand based on the position of the hand in the current image frame.

Figure 20:
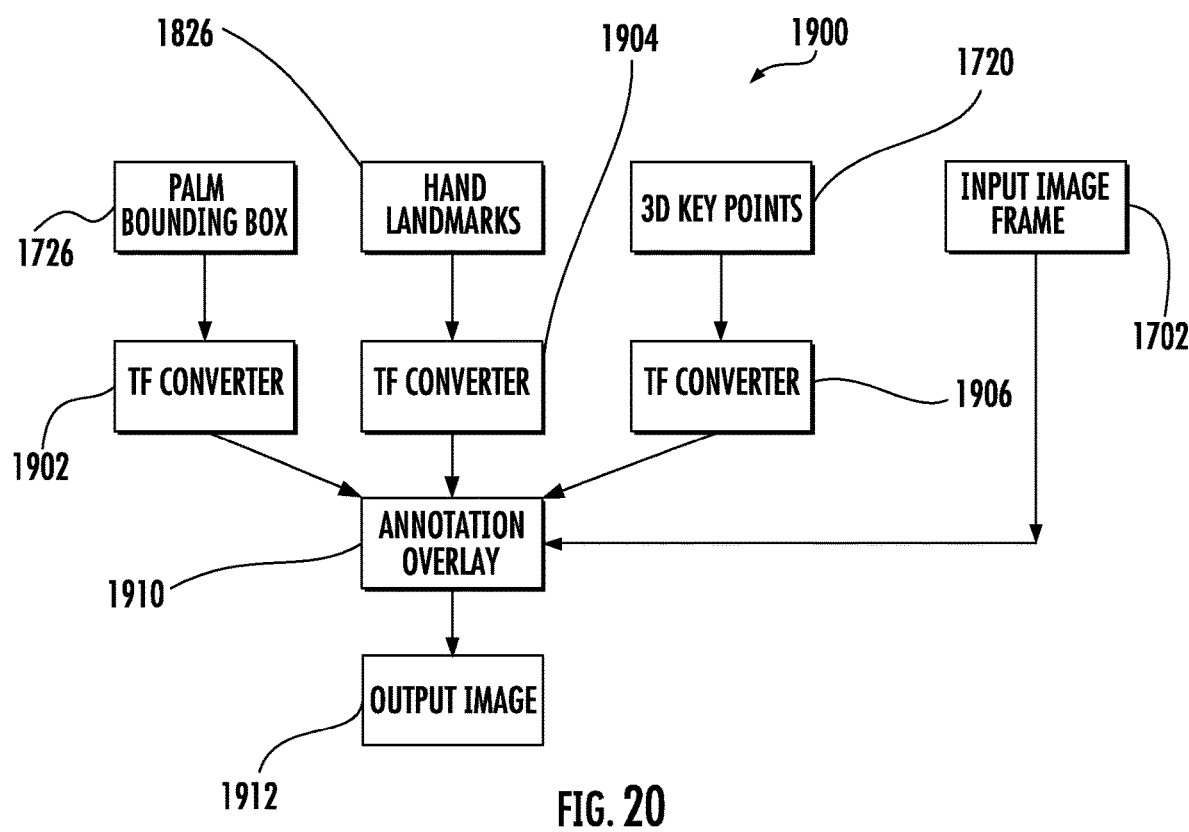
FIG. 20 depicts a block diagram of an example gesture recognition system according to example embodiments of the present disclosure.

FIG. 20 depicts a block diagram for an example rendering system 2000 according to example embodiments of the present disclosure. In this example, an annotated output image 1912 is generated based in part by overlaying a representation of a bounding box 1726 indicative of the position of a hand in an image frame, a plurality of hand landmark positions within the respective image frame 1826, or the a bounding box 1720 that indicates the position of a palm in the image frame onto the respective input image frame 1702. In some examples, the bounding box data indicative of the position of a palm or hand in an image frame is converted into primitive display coordinates using one or more TF functions and/or model 1902. In some examples, the hand landmark positions within an image frame are converted into primitive display coordinates using one or more TF functions and/or model 1904. In some examples, the three-dimensional coordinates corresponding to the hand landmark positions within an image frame are converted into primitive display coordinates using one or more TF functions and/or model 1906.

FIG. 21A depicts a block diagram of an example hand tracking computing system 2100 according to example embodiments of the present disclosure. The system 2100 includes a user computing device 2102, a server computing system 2130, and a training computing system 2150 that are communicatively coupled over a network 2180.

The user computing device 2102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 2102 includes one or more processors 2112 and a memory 2114. The one or more processors 2112 can be any suitable processing device (e.g., a processor core, a microprocessor, an ASIC, a FPGA, a controller, a microcontroller, etc.) and can be one processor or a plurality of processors that are operatively connected. The memory 2114 can include one or more non-transitory computer-readable storage mediums, such as RAM, ROM, EEPROM, EPROM, flash memory devices, magnetic disks, etc., and combinations thereof. The memory 2114 can store data 2116 and instructions 2118 which are executed by the processor 2112 to cause the user computing device 2102 to perform operations.

The user computing device 2102 can include a hand tracking system 2119. The hand tracking system 2119 can track hands in image frames as described herein. One example of the hand tracking system 2119 is shown in FIG. 1. However, systems other than the example system shown in FIG. 1 can be used as well.

In some implementations, the hand tracking system 2119 can store or include one or more palm detection and/or hand landmark models 2120. For example, the palm detection and/or hand landmark models 2120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

One example of a hand tracking system 100 including palm detection and hand landmark detection is discussed with reference to FIG. 1. However, the example hand tracking system 100 is provided as one example only. The models 2120 can be similar to or different from the model(s) in the example hand tracking system 100.

In some implementations, the one or more palm detection and/or hand landmark models 2120 can be received from the server computing system 2130 over network 2180, stored in the user computing device memory 2114, and then used or otherwise implemented by the one or more processors 2112. In some implementations, the user computing device 2102 can implement multiple parallel instances of palm detection and/or hand landmark models 2120 (e.g., to perform parallel palm detection and/or hand landmark detection across multiple instances of input imagery).

Additionally or alternatively to the hand tracking system 2119, the server computing system 2130 can include a hand tracking system 2139. The hand tracking system 2139 can perform hand tracking as described herein.

Additionally or alternatively to the models 2120, one or more palm detection and/or hand landmark models 2140 can be included in or otherwise stored and implemented by the server computing system 2130 that communicates with the user computing device 2102 according to a client-server relationship. For example, the palm detection and/or hand landmark models 2140 can be implemented by the server computing system 2140 as a portion of a web service (e.g., an image processing service). Thus, one or more models 2120 can be stored and implemented at the user computing device 2102 and/or one or more models 2140 can be stored and implemented at the server computing system 2130. The one or more palm detection and/or hand landmark models 2140 can be the same as or similar to the models 2120.

The user computing device 2102 can also include one or more user input components 2122 that receive user input. For example, the user input component 2122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 2130 includes one or more processors 2132 and a memory 2134. The one or more processors 2132 can be any suitable processing device (e.g., a processor core, a microprocessor, an ASIC, a FPGA, a controller, a microcontroller, etc.) and can be one processor or a plurality of processors that are operatively connected. The memory 2134 can include one or more non-transitory computer-readable storage mediums, such as RAM, ROM, EEPROM, EPROM, flash memory devices, magnetic disks, etc., and combinations thereof. The memory 2134 can store data 2136 and instructions 2138 which are executed by the processor 2132 to cause the server computing system 2130 to perform operations.

In some implementations, the server computing system 2130 includes or is otherwise implemented by one or more server computing devices. In instances in which the server computing system 2130 includes plural server computing devices, such server computing devices can operate according to sequential computing architectures, parallel computing architectures, or some combination thereof.

As described above, the server computing system 2130 can store or otherwise include one or more machine-learned palm detection and/or hand landmark models 2140. For example, the models 2140 can be or can otherwise include various machine-learned models. Example machine-learned models include neural networks or other multi-layer non-linear models. Example neural networks include feed forward neural networks, deep neural networks, recurrent neural networks, and convolutional neural networks. One example model 2140 is discussed with reference to FIG. 1.

The user computing device 2102 and/or the server computing system 2130 can train the models 2120 and/or 2140 via interaction with the training computing system 2150 that is communicatively coupled over the network 2180. The training computing system 2150 can be separate from the server computing system 2130 or can be a portion of the server computing system 2130.

The training computing system 2150 includes one or more processors 2152 and a memory 2154. The one or more processors 2152 can be any suitable processing device (e.g., a processor core, a microprocessor, an ASIC, a FPGA, a controller, a microcontroller, etc.) and can be one processor or a plurality of processors that are operatively connected. The memory 2154 can include one or more non-transitory computer-readable storage mediums, such as RAM, ROM, EEPROM, EPROM, flash memory devices, magnetic disks, etc., and combinations thereof. The memory 2154 can store data 2156 and instructions 2158 which are executed by the processor 2152 to cause the training computing system 2150 to perform operations. In some implementations, the training computing system 2150 includes or is otherwise implemented by one or more server computing devices.

The training computing system 2150 can include a model trainer 2160 that trains the machine-learned models 2120 and/or 2140 stored at the user computing device 2102 and/or the server computing system 2130 using various training or learning techniques, such as, for example, backwards propagation of errors. In some implementations, performing backwards propagation of errors can include performing truncated backpropagation through time. The model trainer 2160 can perform a number of generalization techniques (e.g., weight decays, dropouts, etc.) to improve the generalization capability of the models being trained.

In particular, the model trainer 2160 can train the palm detection and/or hand landmark models 2120 and/or 2140 based on a set of training data 2162. The training data 2162 can include, for example, a plurality of training images, where each training image has been labeled with ground truth data that indicates hand landmark positions and/or hand presence. For example, the label(s) for each training image can describe the location (e.g., in the form of a bounding shape) and/or hand landmark positions of a palm and/or hand depicted by the training image. In some implementations, the labels can be manually applied to the training images by humans. In some implementations, the models can be trained using a loss function that measures a difference between a predicted detection and a ground-truth detection. In implementations which include multi-headed models, the multi-headed models can be trained using a combined loss function that combines a loss at each head. For example, the combined loss function can sum the loss from the palm detection head with the loss from the hand landmark detection head to form a total loss. The total loss can be backpropagated through the model.

In some implementations, if the user has provided consent, the training examples can be provided by the user computing device 2102. Thus, in such implementations, the model 2120 provided to the user computing device 2102 can be trained by the training computing system 2150 on user-specific data received from the user computing device 2102. In some instances, this process can be referred to as personalizing the model.

The model trainer 2160 includes computer logic utilized to provide desired functionality. The model trainer 2160 can be implemented in hardware, firmware, and/or software controlling a general purpose processor. For example, in some implementations, the model trainer 2160 includes program files stored on a storage device, loaded into a memory and executed by one or more processors. In other implementations, the model trainer 2160 includes one or more sets of computer-executable instructions that are stored in a tangible computer-readable storage medium such as RAM hard disk or optical or magnetic media.

The network 2180 can be any type of communications network, such as a local area network (e.g., intranet), wide area network (e.g., Internet), or some combination thereof and can include any number of wired or wireless links. In general, communication over the network 2180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 21A illustrates one example computing system that can be used to implement the present disclosure. Other computing systems can be used as well. For example, in some implementations, the user computing device 2102 can include the model trainer 2160 and the training dataset 2162. In such implementations, the models 2120 can be both trained and used locally at the user computing device 2102. In some of such implementations, the user computing device 2102 can implement the model trainer 2160 to personalize the models 2120 based on user-specific data.

Figure 21B:
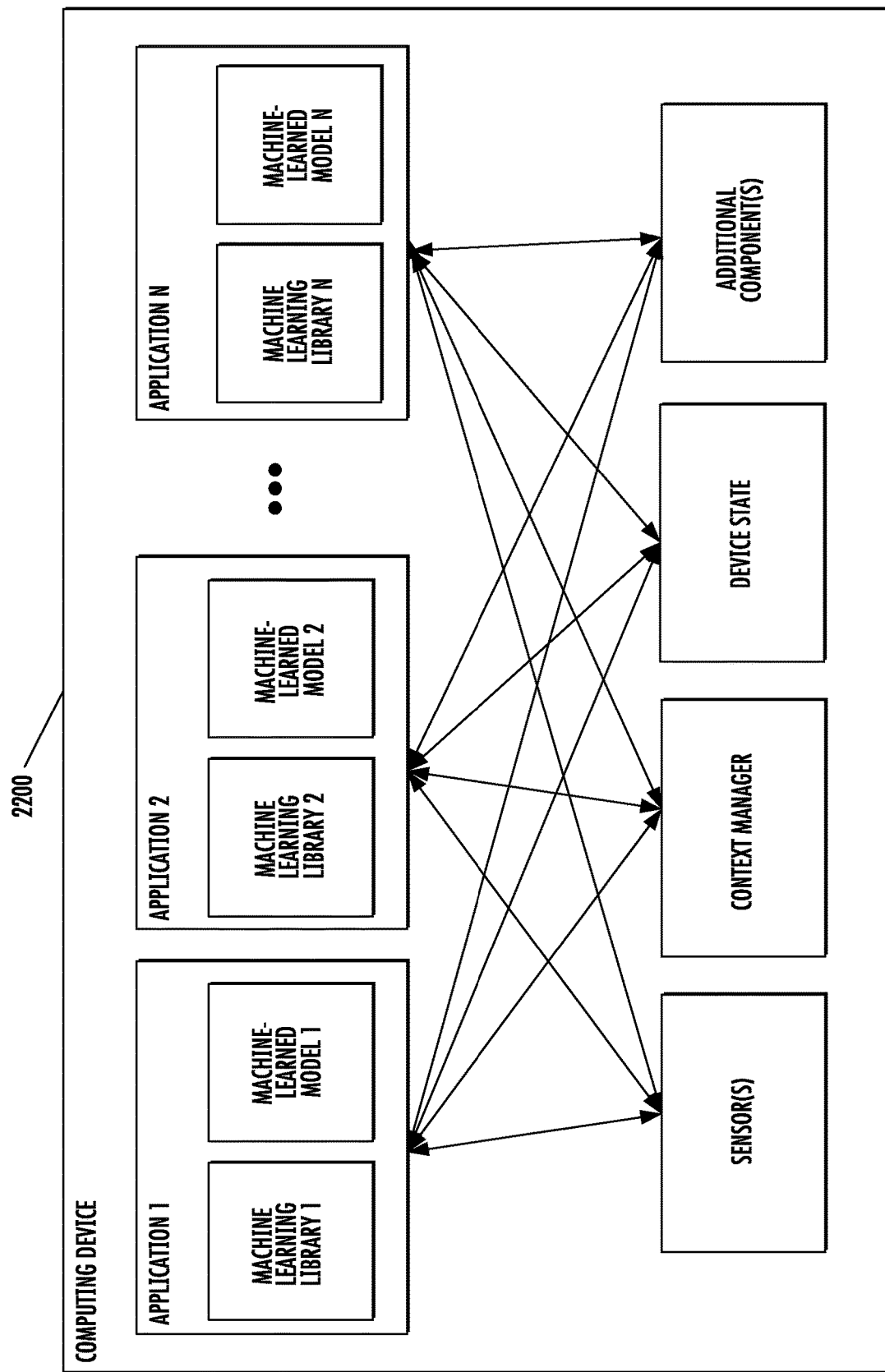
FIG. 21B depicts a block diagram of an example computing device according to example embodiments of the present disclosure.

FIG. 21B depicts a block diagram of an example computing device 2200 that performs according to example embodiments of the present disclosure. The computing device 2200 can be a user computing device or a server computing device.

The computing device 2200 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 21B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 21C depicts a block diagram of an example computing device 2300 that performs according to example embodiments of the present disclosure. The computing device 2300 can be a user computing device or a server computing device.

The computing device 2300 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 21C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 2300.

The central intelligence layer can communicate with a central device data layer. The central device data layer can be a centralized repository of data for the computing device 2300. As illustrated in FIG. 21C, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for hand tracking, the system comprising:
   one or more processors; and
   one or more non-transitory computer-readable media that collectively store instructions that, when executed by the one or more processors, cause the one or more processors to perform operations, the operations comprising:
      obtaining a first image frame, wherein the first image frame is descriptive of a hand comprising a palm;
      processing the first image frame with a machine-learned palm detection model to generate one or more bounding boxes associated with a position of the palm, wherein the position of the palm is determined with the machine-learned palm detection model based on one or more features in the first image frame;
      processing the one or more bounding boxes with a machine-learned hand landmark model to determine a first plurality of hand landmark positions within the first image frame based at least in part on the one or more bounding boxes;
      obtaining ground truth data associated with ground truth hand landmark positions;
      determining a loss function associated with the first plurality of hand landmark positions relative to the ground truth data; and
      backpropagating the loss function associated with the first plurality of hand landmark positions to the machine-learned palm detection model to train the machine-learned palm detection model.

2. The system of claim 1, wherein the operations further comprise:
   determining a first gesture based on the first plurality of hand landmark positions.

3. The system of claim 1, wherein the operations further comprise:
   obtaining a second image frame; and
   processing the one or more bounding boxes and the second image frame with the machine-learned hand landmark model to determine a second plurality of hand landmark positions within the second image frame based at least in part on the one or more bounding boxes.

4. The system of claim 1, wherein the operations further comprise:
   generating one or more second bounding boxes based on the one or more bounding boxes, wherein the one or more second bounding boxes are associated with a location of the hand; and
   wherein the first plurality of hand landmark positions are determined based at least in part on the one or more second bounding boxes.

5. The system of claim 1, wherein processing the one or more bounding boxes with the machine-learned hand landmark model to determine the first plurality of hand landmark positions within the first image frame comprises key-point localization.

6. The system of claim 1, wherein the one or more bounding boxes comprise one or more oriented bounding boxes descriptive of an orientation of at least one of the palm or the hand.

7. The system of claim 1, wherein the first plurality of hand landmark positions comprise a plurality of three-dimensional hand key-points.

8. The system of claim 1, wherein the operations further comprise:
   processing the first plurality of hand landmark positions with a gesture recognition system to determine a first gesture associated with the first image frame.

9. The system of claim 1, wherein the operations further comprise:
   generating image data comprising a cropped image region based on the one or more bounding boxes;
   wherein the first plurality of hand landmark positions are determined based at least in part on the cropped image region.

10. The system of claim 1, wherein processing the first image frame with the machine-learned palm detection model to generate the one or more bounding boxes associated with the position of the palm comprises:
    identifying one or more contextual features in the first image frame;
    determining one or more rigid objects in the first image frame based on the one or more contextual features;
    determining the position of the palm based on the one or more rigid objects; and
    generating the one or more bounding boxes based on the position of the palm.

11. A computer-implemented method for hand tracking, the method comprising:
    obtaining, by a computing system comprising one or more processors, a first image frame, wherein the first image frame is descriptive of a hand comprising a palm;
    processing, by the computing system, the first image frame with a machine-learned palm detection model to generate one or more bounding boxes associated with a position of the palm, wherein the position of the palm is determined with the machine-learned palm detection model based on one or more features in the first image frame, and wherein the machine-learned palm detection model was trained by:

obtaining a set of image frames, wherein the set of image frames depict one or more hands;

processing one or more image frames of the set of image frames with the machine-learned palm detection model to generate one or more respective bounding boxes for the one or more image frames of the set of image frames;

processing the one or more respective bounding boxes with a machine-learned hand landmark model to determine a plurality of respective hand landmark positions;

obtaining ground truth data associated with ground truth hand landmark positions;

determining a loss function associated with the plurality of respective hand landmark positions relative to the ground truth data; and backpropagating the loss function associated with the plurality of respective hand landmark positions to the machine-learned palm detection model to train the machine-learned palm detection model; and processing, by the computing system, the one or more bounding boxes with the machine-learned hand landmark model to determine a first plurality of hand landmark positions within the first image frame, wherein the first plurality of hand landmark positions correspond with a plurality of three-dimensional coordinates.

12. The method of claim 11, wherein the machine-learned palm detection model comprises an encoder-decoder feature extractor, wherein the encoder-decoder feature extractor determines one or more features for determining the position of the palm.

13. The method of claim 11, wherein the one or more features are indicative of at least one of a human hand position in the first image frame, an arm position in the first image frame, a body position in the first image frame, or a face position in the first image frame.

14. The method of claim 11, wherein the one or more bounding boxes comprise one or more oriented bounding boxes determined based at least in part on one or more first contextual features associated with a center of a wrist and one or more second contextual features associated with a metacarpophalangeal joint of a middle finger.

15. The method of claim 11, further comprising:
generating, by the computing system, a cropped image based on the one or more bounding boxes and the first image frame; and
inputting, by the computing system, the cropped image into the machine-learned hand landmark model, wherein the first plurality of hand landmark positions are determined based at least in part on the cropped image.

16. The method of claim 15, wherein the cropped image comprises an image frame region scaled to a pre-defined size.

17. One or more non-transitory computer-readable media that collectively store instructions that, when executed by one or more computing devices, cause the one or more computing devices to perform operations, the operations comprising:

obtaining a first image frame, wherein the first image frame is descriptive of a hand comprising a palm;

processing the first image frame with a machine-learned palm detection model to generate one or more bounding boxes associated with a position of the palm;

generating one or more second bounding boxes based on the one or more bounding boxes, wherein the one or more second bounding boxes are associated with a position of the hand;

processing the one or more second bounding boxes with a machine-learned hand landmark model to determine a first plurality of hand landmark positions within the first image frame based at least in part on the one or more bounding boxes;

obtaining ground truth data associated with ground truth hand landmark positions;

determining a loss function associated with the first plurality of hand landmark positions relative to the ground truth data; and backpropagating the loss function associated with the first plurality of hand landmark positions to the machine-learned palm detection model to train the machine-learned palm detection model.

18. The one or more non-transitory computer-readable media of claim 17, wherein the first plurality of hand landmark positions are determined based on hand geometry of the hand associated with at least one of the one or more bounding boxes or the one or more second bounding boxes, wherein the hand geometry comprises biometrics associated with the hand.

19. The one or more non-transitory computer-readable media of claim 17, wherein the operations further comprise:
generating a rendering based at least in part on the first plurality of hand landmark positions.

* * * * *